United States Patent
Novkovic et al.

(10) Patent No.: US 12,511,456 B2
(45) Date of Patent: Dec. 30, 2025

(54) SYSTEM AND METHOD FOR MONITORING AN OPERATIONAL ENVIRONMENT

(71) Applicant: NEOM Company, Al Khuraybah-Al Dalaa Northern 29 (SA)

(72) Inventors: Goran Novkovic, Riyadh (SA); Hussain Aldawood, Riyadh (SA)

(73) Assignee: NEOM Company, Riyadh (SA)

( * ) Notice: Subject to any disclaimer, the term of this patent is extended or adjusted under 35 U.S.C. 154(b) by 41 days.

(21) Appl. No.: 18/536,202

(22) Filed: Dec. 11, 2023

(65) Prior Publication Data

US 2025/0190650 A1    Jun. 12, 2025

(51) Int. Cl.
G06F 30/20    (2020.01)

(52) U.S. Cl.
CPC .................... G06F 30/20 (2020.01)

(58) Field of Classification Search
CPC .......... G06F 30/20; G06F 30/25; G06F 30/27; G06F 30/28; G06F 2111/00–2119/22; G09B 9/00
See application file for complete search history.

(56) References Cited

U.S. PATENT DOCUMENTS

| | | | |
|---|---|---|---|
| 2009/0271168 A1* | 10/2009 | Minto ............... | G06F 30/20 703/17 |
| 2019/0244537 A1* | 8/2019 | Liberatore ............ | G06F 3/0205 |
| 2022/0270507 A1* | 8/2022 | Ikeda ................. | G09B 9/44 |
| 2023/0007451 A1* | 1/2023 | Stone ................. | G06F 30/20 |
| 2023/0021961 A1* | 1/2023 | Engelberg ............. | G06F 1/26 |
| 2023/0127651 A1* | 4/2023 | Cella ................. | G06Q 30/0201 705/7.11 |
| 2023/0162736 A1* | 5/2023 | Jo .................... | G09B 9/00 704/235 |

(Continued)

FOREIGN PATENT DOCUMENTS

JP    H08320645 A    * 12/1996

OTHER PUBLICATIONS

Ritterbusch et al. "Defining the Metaverse: A Systematic Literature Review" Feb. 9, 2023 (Year: 2023).*

(Continued)

*Primary Examiner* — Rehana Perveen
*Assistant Examiner* — Troy A Maust
(74) *Attorney, Agent, or Firm* — Morgan, Lewis & Bockius LLP

(57) ABSTRACT

There is disclosed a computer implemented method and systems for use in an environmental monitoring alert system to monitor an environment. A method comprises: arranging a plurality of elements in the environment into a structured model; and creating an information library comprising data on the plurality of elements. The data comprises: connections between different elements of said plurality of elements; and operating data for each element. The method further comprises creating a first simulation of the environment, from the structured model and the information library; receiving real-time data from the plurality of elements in the environment; comparing the real-time data for the plurality of elements to baseline data obtained from the first simulation; and initiating an alert in response to a deviation of the real-time data for a first element of the plurality of elements, from the baseline data for said first element.

26 Claims, 12 Drawing Sheets

(56) References Cited

U.S. PATENT DOCUMENTS

| | | | |
|---|---|---|---|
| 2023/0169229 A1* | 6/2023 | Ramanasankaran | G06F 30/13 703/1 |
| 2023/0409776 A1* | 12/2023 | Matsuo | G05B 19/41885 |
| 2023/0409993 A1* | 12/2023 | Jacobs | G09B 9/003 |
| 2024/0070350 A1* | 2/2024 | Pimplikar | G06Q 10/067 |
| 2024/0127690 A1* | 4/2024 | Syed | G08B 29/185 |

OTHER PUBLICATIONS

Xie et al. "Parallel Simulation Decision-Making Method for a Response to Unconventional Public Health Emergencies Based on the Scenario-Response Paradigm and Discrete Event System Theory" (Year: 2019).*

Jwo, J.-S.; Lee, C.-H.; Lin, C.-S. Data Twin-Driven Cyber-Physical Factory for Smart Manufacturing. Sensors 2022, 22, 2821. (Year: 2022).*

Fatta et al. "Integrated environmental monitoring and simulation system for use as a management decision support tool in urban areas" (Year: 2001).*

\* cited by examiner

SYSTEM AND METHOD FOR MONITORING AN OPERATIONAL ENVIRONMENT

TECHNICAL FIELD

The present disclosure relates to a system for and a method of monitoring an operational environment for the purpose of detecting an abnormal operating condition within the operational environment and more particularly, though not exclusively, to an operational environment monitoring system which can generate an enriched information alert to an risk event which can help to diagnose and revert an operational environment back to a normal operating condition. The present disclosure also extends to a simulator for training users how to correctly use such environmental monitoring systems and correctly respond to the generation of alerts to such risk events.

BACKGROUND

Operational environments can contain a myriad of different systems and devices, and are typically monitored continuously for certain events which cause a risk to the functioning of that operational environment. An operational environment may include multiple elements such as processes, systems, networks, and devices, and use multiple monitoring systems to monitor various aspects of the functions being performed in the environment. The term 'operational environment' as used herein, is a broad term which encompasses industrial environments where some form of industrial process or activity is being carried out, such as factories or material processing plants, as well as non-industrial environments such as office environments where the primary function may be user interactions with computers. In addition, the operational environment may be for a single organisation but one which has multiple geographical sites. Accordingly, all such operational environments, regardless of configuration or geographical location, are referred to herein as 'monitored environments'.

Each monitoring system of the monitored environment, may be dedicated to monitoring a specific element or function in the monitored environment or be dedicated to monitoring for a specific risk event in the monitored environment. Many of these monitoring systems are dedicated to the function they perform, and as such, typically each monitoring system is monitored by a different set of users. For example, a monitoring system within the monitored environment may be a control system for a control operator to monitor and control the levels of fluids within tanks for an industrial process. In another example, the same monitored environment may include a cybersecurity monitoring system, which monitors networks and devices connected to those networks in order to detect and alert cybersecurity users (such as cybersecurity operators or analysts) to the occurrence of cyber-attacks. Also monitoring devices provided to the same monitoring environment, may report back to the manufacturer to enable the manufacturer to collect valuable data regarding the use of the monitoring device. Typically, individual monitoring systems in a monitored environment operate relatively autonomously and are not in communication with each other. As such, these systems can only provide a particular narrow view of events and risks occurring within the monitored environment and consequently, any remedial action to mitigate such risks are limited to addressing the view as presented.

The present disclosure is directed to addressing the above-described limitations of the know prior art systems.

SUMMARY OF THE DISCLOSURE

According to an aspect of the present disclosure, there is a computer implemented method for use in an environmental monitoring alert system to monitor an environment, the method comprising arranging a plurality of elements in the environment into a structured model, and creating an information library comprising data on the plurality of elements, the data comprising connections between different elements of said plurality of elements and operating data for each element. The method further comprises creating a first simulation of the environment, from the structured model and the information library, receiving real-time data from the plurality of elements in the environment, comparing the real-time data for the plurality of elements to baseline data obtained from the first simulation, and initiating an alert in response to a deviation of the real-time data for a first element of the plurality of elements, from the baseline data for said first element.

The environment may comprise two or more operational sites, wherein the structured model is a hierarchical model, and the hierarchical model comprises a global operation level in the hierarchy for elements common to all operational sites in the environment and at least one sub-level corresponding to each operational site.

Each respective operational site may comprise at least one sub-level corresponding to operational processes performed on the respective operational site, the operational processes level may further comprise at least one sub-level corresponding to operational systems related to the respective operational processes, the operational systems level may further comprise at least one sub-level corresponding to operational networks in the respective operational systems, and the operational networks level may further comprise at least one sub-level corresponding to operational devices in the respective operational networks.

The present disclosure allows for monitoring events in the environment, and also for including data from networks or system associated with the environment, such as cybersecurity information or database information (for example, factory blueprints, shift rotas). It is possible to incorporate the associated data since the six-layer hierarchical model connects all elements within the environment. As a result of the model, the method provides an enhanced view of the alert.

In a further aspect of the present disclosure there is a computer implemented method for use in a training system for training a User to monitor an environment. The method comprises arranging a plurality of elements in the environment into a structured model, and creating an information library comprising data on the plurality of elements, the data comprising connections between different elements of said plurality of elements and operating data for each element. The method further comprises creating a first simulation of the environment, from the structured model and the information library, creating a second simulation of the environment, the second simulation having sub-optimal or abnormal operating conditions, and causing the second simulation to be presented on a display for use in a training simulation.

In another aspect of the present disclosure, there is a computer implemented method for use in monitoring an environment, the method comprising arranging a plurality of elements in the environment into a structured model, and creating an information library comprising data on the plurality of elements, the data comprising connections between different elements of said plurality of elements and operating data for each element. The method further comprises creating a first simulation of the environment, from the structured model and the information library.

In a further aspect of the present disclosure there is a computer system for use in an environmental monitoring alert system to monitor an environment, the computer system comprising a memory comprising instruction data representing a set of instructions, and a processor configured to communicate with the memory and to execute the set of instructions. The set of instructions when executed by the processor, cause the processor to arrange a plurality of elements in the environment into a structured model, and create an information library comprising data on the plurality of elements, the data comprising connections between different elements of said plurality of elements and operating data for each element. The set of instructions when executed by the processor, further cause the processor to create a first simulation of the environment, from the structured model and the information library, receive real-time data from the plurality of elements in the environment, compare the real-time data for the plurality of elements to baseline data obtained from the first simulation, and initiate an alert in response to a deviation of the real-time data for a first element of the plurality of elements, from the baseline data for said first element.

In a further aspect of the present disclosure there is a computer system for use in a training system for training a user to monitor an environment, the computer system comprising a memory comprising instruction data representing a set of instructions and a processor configured to communicate with the memory and to execute the set of instructions. The set of instructions when executed by the processor, cause the processor to arrange a plurality of elements in the environment into a structured model, and create an information library comprising data on the plurality of elements, the data comprising connections between different elements of said plurality of elements and operating data for each element. The set of instructions when executed by the processor, further cause the processor to create a first simulation of the environment, from the structured model and the information library, create a second simulation of the environment, the second simulation having sub-optimal or abnormal operating conditions, and cause the second simulation to be presented on a display for use in a training simulation.

In a further aspect of the present disclosure there is a computer system for use in monitoring an environment, the computer system comprising a memory comprising instruction data representing a set of instructions and a processor configured to communicate with the memory and to execute the set of instructions. The set of instructions when executed by the processor, cause the processor to arrange a plurality of elements in the environment into a structured model and create an information library comprising data on the plurality of elements, the data comprising connections between different elements of said plurality of elements and operating data for each element. The set of instructions when executed by the processor, further cause the processor to create a first simulation of the environment, from the structured model and the information library.

Certain embodiments commensurate in scope with the originally claimed subject matter are summarised below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

BRIEF DESCRIPTION OF THE DRAWINGS

Specific embodiments of the disclosure will now be described, by way of example, with reference to the accompanying drawings of which.

DETAILED DESCRIPTION

Aspects of the present disclosure are related to an environment monitoring system that may be used as a real-time alert system for a monitored environment that can, in use, generate an alert to a risk situation or risk event for a user (for example an operator or an analyst monitoring the environment). The risk situation or risk event may include an emergency situation or may simply be generated when a problem occurs or is predicted to occur with respect to the one of the functions being performed in the monitored environment. The environment monitoring system also has further or alternative applications as a training simulator independent of any real-time alert system functionality, which can help to train a user regarding how to respond correctly to a risk situation/risk event when the same occurs.

Figure 1:
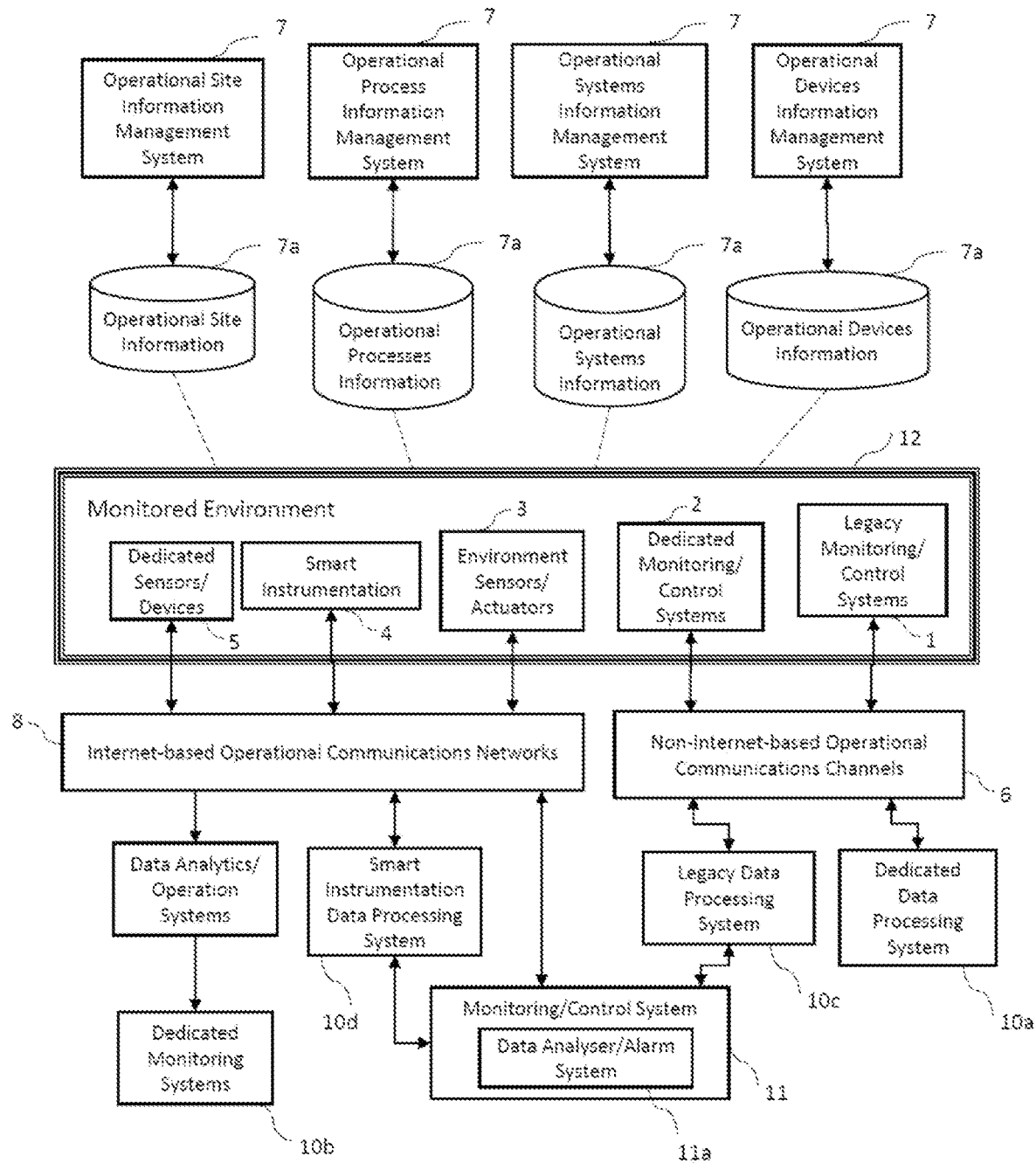
FIG. 1 is a schematic block diagram showing a prior art arrangement of different systems for monitoring an aspect of a monitored environment.

FIG. 1 shows a very simplified block diagram of an example monitored environment 12 monitored using prior art systems and methods. As has been mentioned previously, a monitored environment 12 is any environment where a function is being carried out and where monitoring may be useful, for example a production plant, a bank, an office, or a factory. Additionally, a monitored environment 12 may include multiple sites across different geographic locations, for example, a plurality of factories operating in different countries.

A monitored environment 12 may include various elements such as devices, networks, systems, and processes. These elements are monitored by monitor devices/systems within the monitored environment 12. For the purposes of this description, the devices/system within the monitored environment which provide data regarding the operational state of the elements, are also referred to as elements. The example monitored environment 12 illustrated in FIG. 1 includes monitor devices/systems (elements) such as legacy monitoring and control systems 1, dedicated monitoring and control systems 2, environment sensors and actuators 3, smart instrumentation 4, and dedicated devices and sensors 5 (although it should be appreciated that other monitor devices/systems (elements) which monitor a specific aspect of the monitored environment such as a complex process and/or system may also be included). In prior art monitoring arrangements, typically different aspects of these elements in the monitored environment 12 are monitored using different dedicated systems, as described below.

Each of the elements 1, 2, 3, 4, 5 within the monitored environment 12 of FIG. 1 provide data to an external system 10 regarding an aspect of operation processes occurring in the monitored environment. Each external system 10 may provide a different function, for example external systems 10a, 10b, 10c, 10d may be operational monitoring systems, cybersecurity systems, physical security systems, data analytics or processing systems, or device manufacturers' monitoring systems for their supplied devices. A monitoring/control system 11 comprising a data analyser and alarm system 11a, may receive data from some of the external systems 10a, 10b, 10c, 10d in order to monitor these aspects of the monitored environment 12, and provide an alert if an operational problem or risk event is detected. Examples of such monitoring/control systems include a SCADA (Supervisory Control and Data Acquisition) system, a DCS (Distributed Control System), an IACS (Industrial Automation Control System) or an ICS (Industrial Control System). However in this know arrangement, some of the external systems are isolated, and monitored separately from the monitoring and control system 11 (for example, device manufacturer's monitoring data is typically not provided to the alarm system 11a for a monitored environment but is rather relayed back to the manufacturer's own domain for further data analysis). This example is shown as the dedicated monitoring system 10b in FIG. 1. Thus, the monitoring/control system 11 has a restricted view of the operation of the elements within the monitored environment 12 limited only to those elements 1,2,3,4,5 it receives data from.

In the prior art example illustrated in FIG. 1, the monitor devices/systems 1, 2, 3, 4, 5 communicate via a communications channel 6 or wide area network 8 (such as the internet) to provide data to the external systems 10a, 10b, 10c, 10d. The legacy and dedicated monitoring/control systems 1, 2 provide data via non-internet-based operational communication channels 6 to a legacy data processing system 10c and a dedicated data processing system 10a. While the legacy data processing system 10c may, in turn provide data to the monitoring/control system 11, the dedicated data processing system 10a is isolated, and does not communicate with the monitoring/control system 11. The dedicated data processing system 10a may be, for example, a data analytics system for a sensor monitoring system.

The environment sensors and actuators 3, smart instrumentation 4, and dedicated sensors and devices 5 may provide data to external systems 10 via internet/ethernet-based operational communication networks 8. Some data may be provided directly to the monitoring/control system 11 via internet-based communication networks 8, but networks 8 also facilitate data being provided to other external systems such as a smart instrumentation data processing system 10d, and a data analytics/operations system. The smart instrumentation data processing system 10d may provide data to the monitoring/control system 11, however the data analytics/operation systems may be monitored using dedicated monitoring systems 10b, which are isolated. For example, the dedicated monitoring system 10b may be a cybersecurity system operated by a dedicated cybersecurity team. The data received and created by the dedicated monitoring system 10b is therefore not provided to the monitoring/control system 11. In some cases (not shown in FIG. 1), smart instrumentation (for example flowmeters, pressure sensors and level transmitters) which is capable of providing large amounts of data about the monitored environment, is hardwired to a dedicated data processing system 10a and only a fraction of the data it generates is used for a specific purpose.

FIG. 1 also shows several different external management systems 7 which hold information in respective datastores (for example databases) 7a which is indirectly related to the monitored environment. Much of this is information which describes aspects of the monitored environment, which may be static, and which is not itself actively monitored in the environment. For example, operational site information such as that pertaining to the layout of the monitored environment (such as building blueprints), or the number of machines installed on a factory floor and the rota for shift workers, may be provided. Similarly Information pertaining the operational processes (such as operational manuals), operational systems (such as specific protocols and thresholds of operation), and operational devices information (such as setpoints or photos showing healthy operation) may be stored in the local data stores (such as databases) 7a and maintained by the respective management systems 7. Whilst such information is related to the monitored environment 12, it is not used in any active monitoring of the monitored environment 12.

The monitoring/control system 11 is thus configured to receive data from some specific elements 1,2,3,4,5 in the environment 12, and does not have knowledge regarding events occurring in other parts of the environment 12 which may be sensed by other systems 10a, 10b. In such environment monitoring systems 11, where the system is dedicated to monitoring only some elements of the environment 12, typically the data analyser/alarm system 11a activates an alert if a threshold for a particular parameter related to one or more elements 1,2,3,4,5 is exceeded, and the alert is sent to a user (such as an analyst or operator). The user can see where the alert originated from but receives limited or no information on operations or events occurring elsewhere within the environment 12 (that are monitored using separate systems 10a, 10b) that may have affected the monitor devices/systems 1,2,3,4,5 for which the alert was sent. The user of the monitoring/control system 11 therefore has a restricted view of events occurring in the environment and limited information to consider when determining the best course of response to a risk event, namely the optimum corrective/preventative action to take to resolve the alerted issue regarding an event occurring within the monitored environment 12. Such responsive action may include for example deactivating systems, increasing, or decreasing processing speeds, turning off communications on certain networks and/or locking doors within the environment 12.

Figure 2:
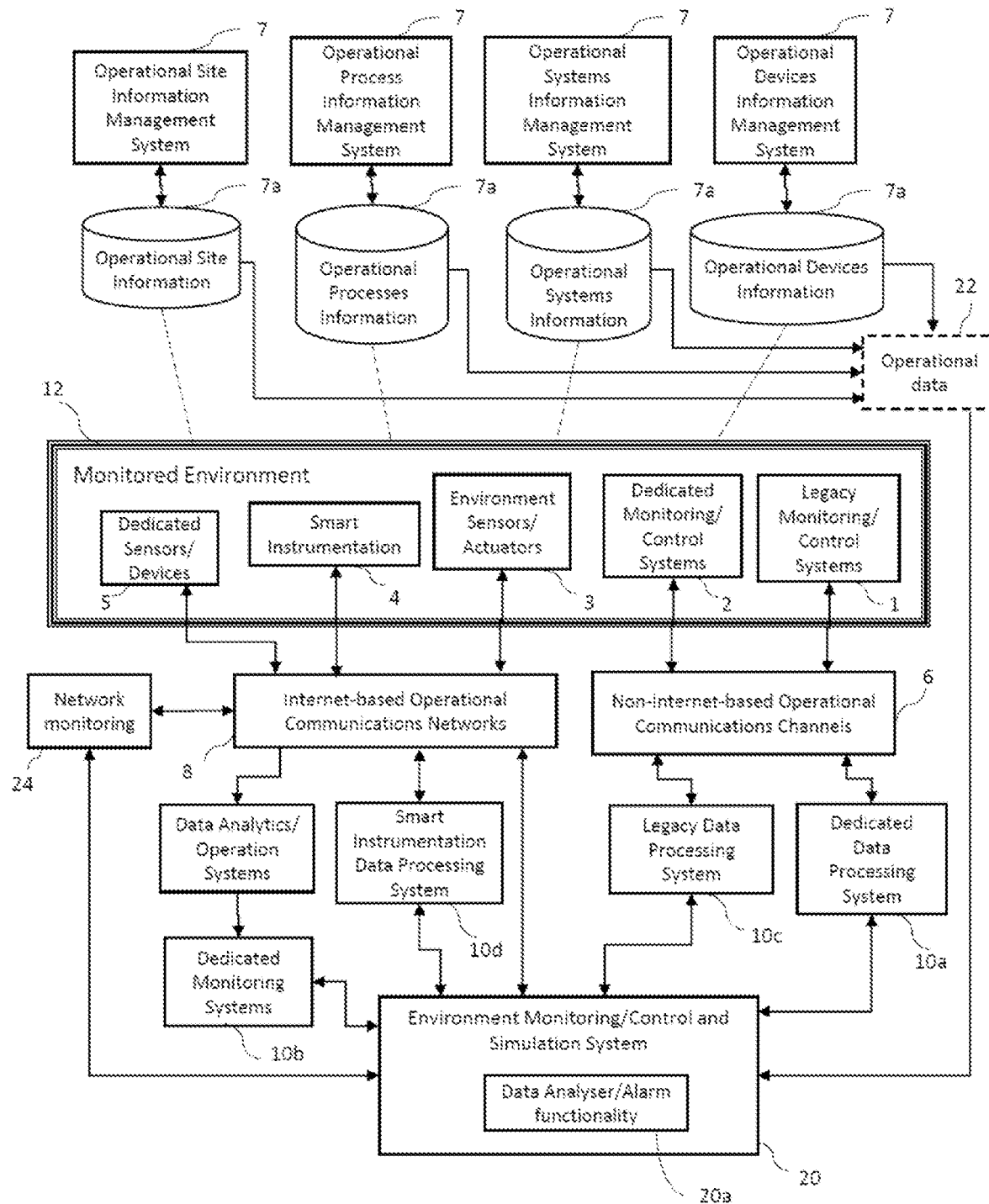
FIG. 2 is a schematic block diagram showing a system for monitoring an entire monitored environment in accordance with embodiments of the present disclosure.

FIG. 2 shows a very simplified view of an Environment Monitoring and Simulation System (EMSS) 20 according to embodiments of the present disclosure, operating to monitor the same environment 12 as illustrated in FIG. 1. Again, the monitored environment 12 comprises a plurality of elements 1,2, 3, 4, 5. In some embodiments, the EMSS 20 may be configured to receive data from every element within the environment 12 via the external systems 10*a*, 10*b*, 10*c*, 10*d*: as illustrated, every external system 10*a*, 10*b*, 10*c*, 10*d* provides data to the EMSS 20. Thus all elements 1,2,3,4,5 within the environment 12 are monitored using the same system 20. Receiving data from every monitor devices/system 1,2,3,4,5 in the environment 12 allows the EMSS 20 to gain more varied and diverse information regarding the operational state of the elements within the monitored environment 12 and events occurring within the monitored environment.

As shown in FIG. 2, data pertaining to network monitoring 24 (which may have been provided for cybersecurity purposes for example) is also accessed in this embodiment, and this network data for the internet-based operational communication network 8 is provided to the EMSS 20 and monitored to supplement the data received from the elements 1,2,3,4,5 in the monitored environment 12. Additionally, operational data 22 relating to the monitored environment 12 is also provided to the EMSS 20. This operational data 22 comprises the information described above with reference to FIG. 1: namely operational site information, operational processes information, operational systems information, and operational devices information obtained from the data stores 7*a* or the management systems 7. The operational data 22 can be used by the EMSS 20 to increase understanding of the monitored environment 12 and enable the data analyser/alarm functionality 20*a* to provide alerts with greater detail of context than has been possible before as is described in detail below.

Accordingly, when a deviation (or anomaly) in the data received from any element of the environment 12 is detected by the EMSS 20 and an alert generated for the user, more comprehensive information may be provided about the events occurring within the monitored environment which led to the generation of the alert. This enriched information may include the exact location of the problem which has been detected by the elements 1,2,3,4,5 showing a deviation, and information on other elements proximate or linked to the element showing the deviation. For example, if there is a deviation in network data, data on all devices (elements) on that network may be retrieved by the system 20 and provided with the alert, allowing the user to determine the cause of the alert more easily. Operational data 22 for the element regarding which the alert is being generated may also be provided, which may comprise normal operating conditions, operation thresholds, or operation manuals, for example. Thus, in general, the EMSS 20 according to the present disclosure provides a higher resolution alert, providing more information on the monitored environment 12 to the user. The increased knowledge of events occurring in the monitored environment 12 is extremely beneficial when determining the best action to take in response to receiving an alert from the EMSS 20. This is because an event occurring within a monitored environment 12 that is detected by a deviation in data from a single element (a network, system, or device), will likely be detected in different ways by other elements within the same environment 12. Even if a first event sensed by a first element is not sensed by second or third element, knowledge of other events, which were sensed by the other elements (prior to or simultaneously with the first event), may enable the cause of the first event to be determined more accurately.

Figure 3:
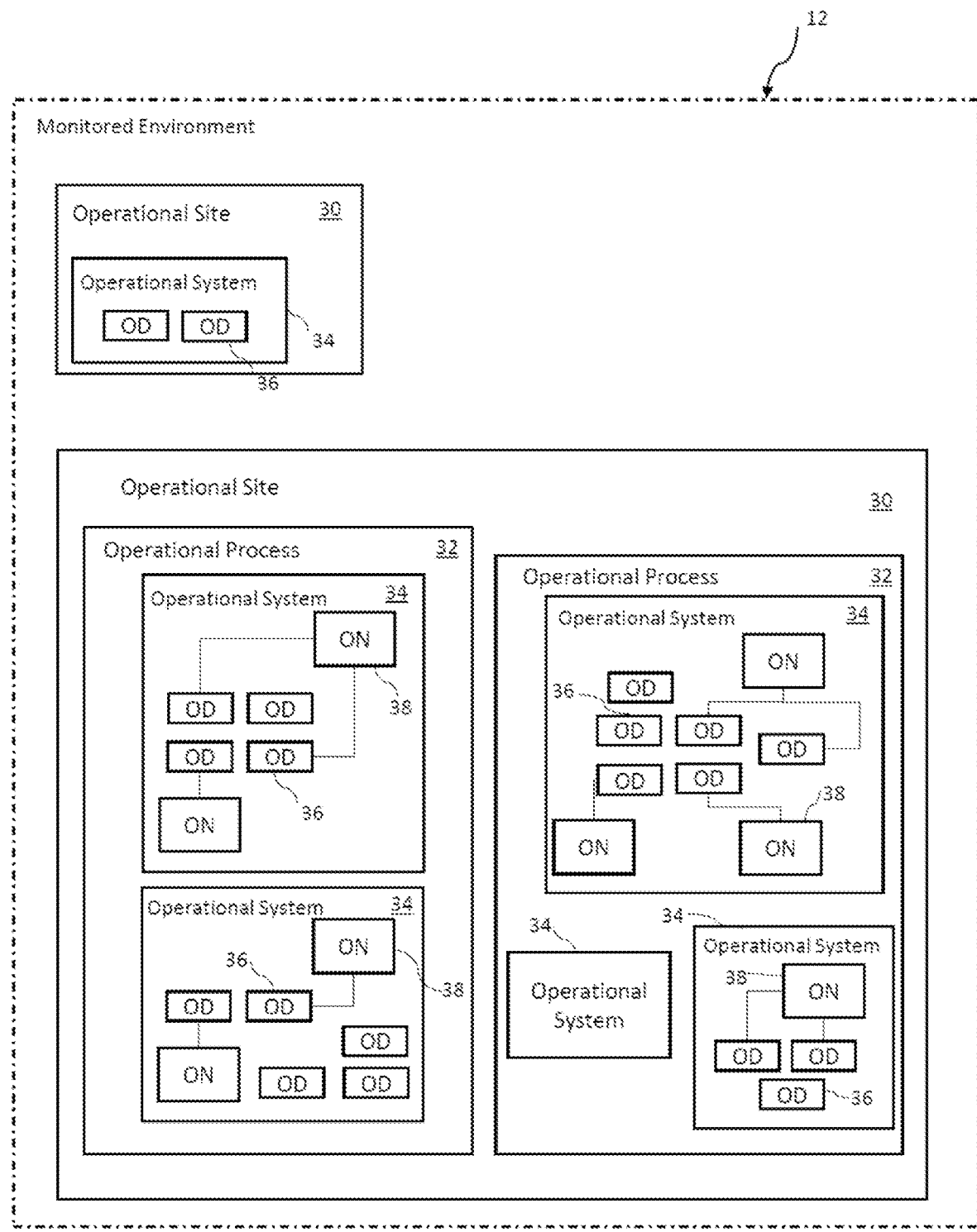
FIG. 3 is a detailed schematic block diagram showing an example of several different elements organised within a monitored environment.

The EMSS 20 of the present disclosure may be implemented for any monitored environment 12, and an example of such an environment 12 is shown by the schematic diagram in FIG. 3. A monitored environment 12 typically comprises both operational technology (OT) (networks, systems and devices which relate to some aspect of the operation of the monitored environment) and Internet of Things technology (IoT) (IoT devices connected on operational networks), which are part of bigger operational systems and processes. The monitored environment 12 comprises an operational site 30, and whilst in some examples the monitored environment 12 comprises only one operational site 30, the example illustrated in FIG. 3 shows two operational sites 30, which may be spaced across two separate geographic locations. In other examples, the environment 12 may comprise many more operational sites 30, for example, a global entity may have multiple factories across different countries. As illustrated, an operational site 30 may include a plurality of operational processes 32, which in turn each include one or more operational systems 34. The operational systems 34 comprise one or more operational devices (OD) 36, which may be connected to operational networks (ON) 38 or be hardwired.

It is important to monitor all aspects of a monitored environment 12, including the operational processes 32, operational systems 34, operational networks 38 and operational devices 36. Monitoring operational processes 32 and systems 34 allows process deviations such as deviations away from setpoints, deviations away from the required operating conditions, or departures from expected values to be detected. Monitoring operational networks 38 is important for detecting network anomalies such as network speed degradation or changes in network interactions. Monitoring operational devices 36 then allows device health and status issues such as device fault, calibration, or configuration changes to be detected. Changes in any of the environment elements 30, 32, 34, 36, 38 may cause disruption in the monitored environment 12, and thus it is important to have a robust monitoring and alerting system. Additionally, many environment elements 30, 32, 34, 36, 38 are connected or linked in some way, and as has been mentioned previously a monitoring system that monitors the entire environment 12 may be highly desirable as such a system provides greater knowledge of events occurring within the environment 12 to users to determine the cause of the event.

As discussed briefly with respect to FIG. 1, different aspects of a monitored environment 12 are typically monitored by different users. For example, operational data and cybersecurity data may be monitored by completely different teams, who are not actually interested in the activity of the other team. Also physical security systems (such as CCTV cameras) may be monitored by a dedicated building security team. Network operations (relating to functional operation rather than cybersecurity) may be monitored by a dedicated IT team. Statistical data on devices (relating to uptime, downtime, and trends, for example) may be generated and monitored by device manufacturers or data analytics teams. The EMSS 20, according to embodiments of the present disclosure, monitors all of this data in a single monitoring system, providing a single user with full visibility and a better understanding of risk events occurring in the monitored environment 12.

Figure 4:
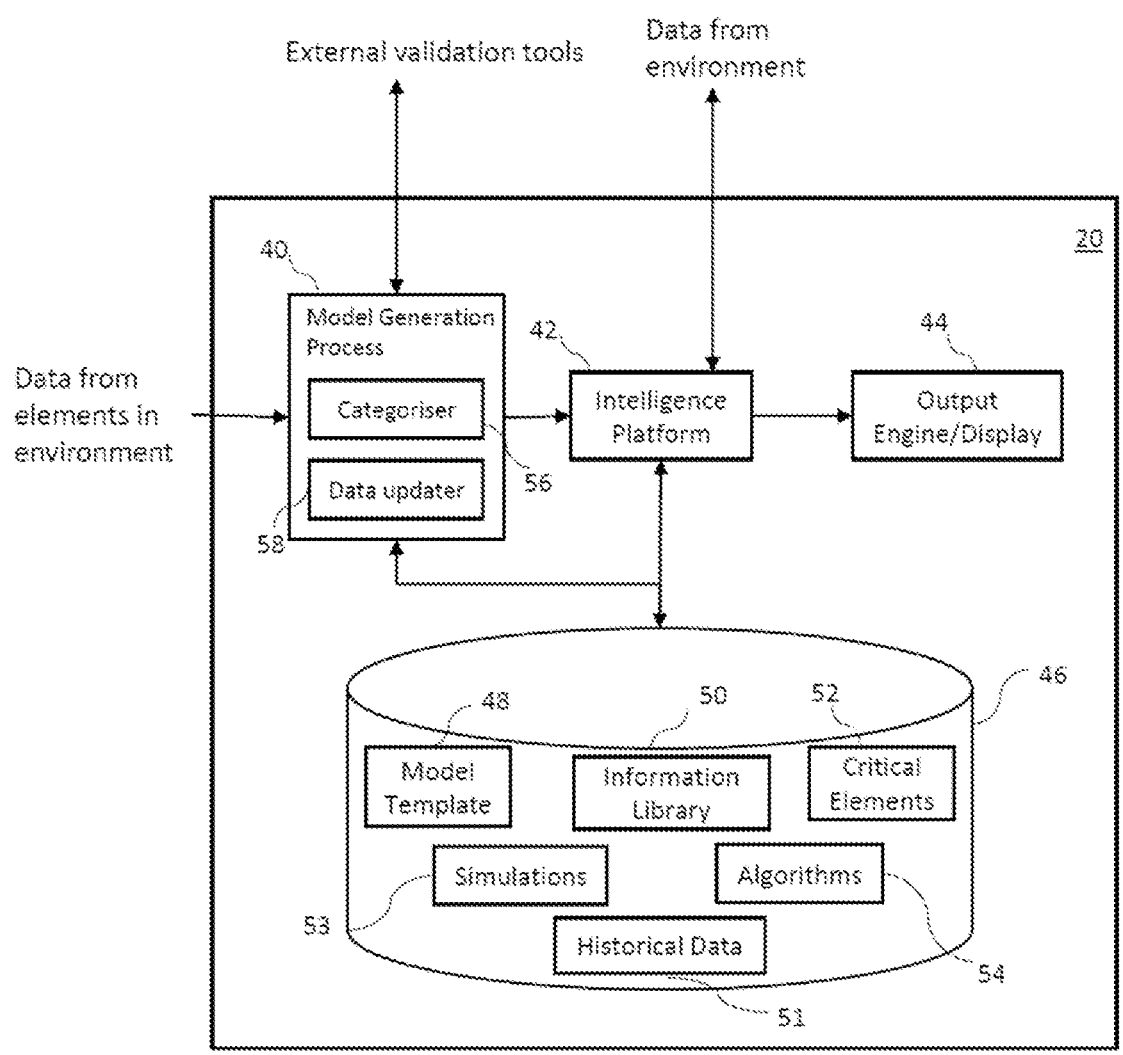
FIG. 4 is a schematic block diagram showing details of the environment monitoring system of FIG. 2.

Components of the EMSS 20, according to embodiments of the present disclosure, are shown in the block diagram in FIG. 4. The EMSS 20 includes a Model Generation Process 40 the output of which is provided to an Intelligence Platform 42, which is in turn coupled to an output display 44. The Model Generation Process 40 receives data from and sends data to a datastore 46. The Intelligence Platform 42 is also in communication with the datastore 46 to retrieve data from and store data in the datastore 46. The datastore 46 comprises a model template 48, an information library 50, critical elements 52, and historical real-time data 51, each of which is described in greater detail later. In some embodiments (namely when the EMSS 20 is used as a training simulator), the datastore 46 additionally comprises simulations 53 and algorithms 54 for operating the simulator. Whilst the datastore 46 has been shown in FIG. 4 to be provided within the EMSS 20, in some embodiments, the datastore 46 may be provided remotely, for example via cloud storage.

As mentioned briefly above, in some embodiments, the EMSS 20 may operate to monitor an entire monitored environment 12. In operation, the EMSS 20 creates an environment simulation (real-time live model) of the monitored environment 12, monitors real-time data obtained from the elements within the environment 12, and if a variation in the normal operation of the environment is detected, sends an alert to a user. Accordingly, in some embodiments the EMSS 20 may be used as a real-time alert system. In other embodiments, the EMSS 20 may be used as a training simulator for trainees. Both operations will be discussed in detail below.

Returning to FIG. 4 and considering firstly the EMSS 20 as a real-time alert system, in use, all elements 32, 34, 36, 38 within a target monitored environment 12 are documented and input to the Model Generation Process 40. The Model Generation Process 40 comprises a categoriser 56 and a data updater 58. The categoriser 56 retrieves the model template 48 from the datastore 46 and categorises (e.g. arranges) the received environment elements 32, 34, 36, 38 using the model template 48 in order to create a structured model of the environment 12. As described previously, environment elements may include operational devices 36, networks 38, systems 34, processes 32, and sites 30. The categoriser 56 also retrieves the information library 50 from the datastore 46. The information library 50 comprises data on each element 32, 34, 36, 38 included in the structured model of the environment 12, including operational data such as required operation conditions, setpoint values and/or operation thresholds or similar for each element. The information library 50 may also comprise metadata such as unstructured data on the environment 12 and individual elements 32, 34, 36, 38. For example, information for use in creating a three-dimensional representation of an operational site, e.g. such as data indicating the physical layout of an operational site in the environment. Examples include but are not limited to blueprints of the operational site, room layouts, operation manuals, SOPs, maintenance lists, flow diagrams, and PID loops. The unstructured data can be stored in different forms including text, spreadsheets, photos, and videos. The metadata may also comprise structured data (such as digital twins, 3D models, etc). Information on how different environment elements 30, 32, 34, 36, 38 are related, and thus information on relationships and connections between environment elements 30, 32, 34, 36, 38 is also included in the information library 50. These relationships and connections are also incorporated into the structured model by the categoriser 56 such that each element 30, 32, 34, 36, 38 is connected by the model to other elements 30, 32, 34, 36, 38. In this sense two elements can be related or connected due to their physical proximity to one another, due to a logical connection between the elements and/or due to a physical connection (e.g. the elements may be able to communicate with one another, or they may be physically tethered). This enables the expected effects of an event in the environment on one element and other elements connected (related) to that one element to be determined, as is explained later. The categoriser 56 may be operated manually, and in some embodiments, some aspects may be operated automatically.

The structured model is validated at regular intervals by external validation tools to ensure every element 30, 32, 34, 36, 38 in the environment 12 has been captured, and to ensure that all data in the information library 50 (and thus the data and relationships in the structured model) is accurate and up to date. Validation is important as monitored environments 12 are constantly changing and so the model needs constant updating. For example, alarm thresholds may be changed, logic changes may be made to controllers, or new devices 36 may be added into operational systems 32 during routine maintenance of elements 30, 32, 34, 36, 38. Thus, regular validation is required to ensure all environment updates are captured by the EMSS 20 to update the structured model.

If the external validation tool detects a discrepancy between the environment 12 and the information in the structured model, the discrepancy is communicated to the data updater 58, which updates the information library 50, and stores the updated version of the information library 50 in the datastore 46. The data updater 58 also updates the data included in the structured model. Similarly, if the external validation tool detects a difference between the elements in the environment 12 compared to those included in the structured model, the data updater 58 adds or removes the element 30, 32, 34, 36, 38, and updates the linked connections and relationships for that element. Validation occurs at regular intervals, for example once a day, in order to ensure any changes in the environment 12 are documented. However, in other more time-critical systems, the validation intervals may be shorter, such as every hour.

Once validated, the structured model and data in the information library 50 is used by the Intelligence Platform 42 to create the environment simulation (real-time live model of the target environment 12), and the environment simulation is provided to the output display 44 to be viewed by a user. This environment simulation is a detailed visualisation of the environment 12, providing an interactive view of the full monitored environment 12. It should be appreciated that the environment simulation is also updated regularly, in line with any updates made during validation. Similarly, in other more time-critical systems, the updates may be more frequent, such as every hour.

Alongside the model template 48 and information library 50, the datastore 46 also includes the critical elements 52. The critical elements 52 are a set of data comprising the specific elements 30, 32, 34, 36, 38 of the environment 12 that are to be monitored, which are defined prior to use by the user. The critical elements 52 may be the elements that are most important for ensuring continuous, safe operation within the target environment 12, or the elements that are most prone to failure. For example, the critical elements 52 may be defined by the user as all safety devices in the environment 12, all elements within a specific location in the environment 12, or specific processes 32, systems 34, networks 38, or devices 36 in the environment 12 may be chosen. While in the described embodiment the critical elements 52 are a subset of all elements within the target monitored environment 12, it should be appreciated that, in other embodiments, the EMSS 20 may monitor every element within the environment 12.

In use as a real-time alert system, the Intelligence Platform 42 retrieves the critical elements 52 from the datastore 46, and then monitors the critical elements 52 of the environment 12. The Intelligence Platform 42 receives real-time data from the critical elements 52 and upon detecting a deviation in the real-time data (for example, a deviation of a parameter, associated with the critical element, to be outside a normal operating range), the Intelligence Platform 42 provides an alert with comprehensive data (relating to the parameter values of the critical element and the elements associated with (or e.g. connected to) that critical element) to the output display 44, to be viewed by a user. Although this has been described for the critical elements, it will be appreciated that the process could equally be performed for any other subset of elements (such as a first element).

Figure 5:
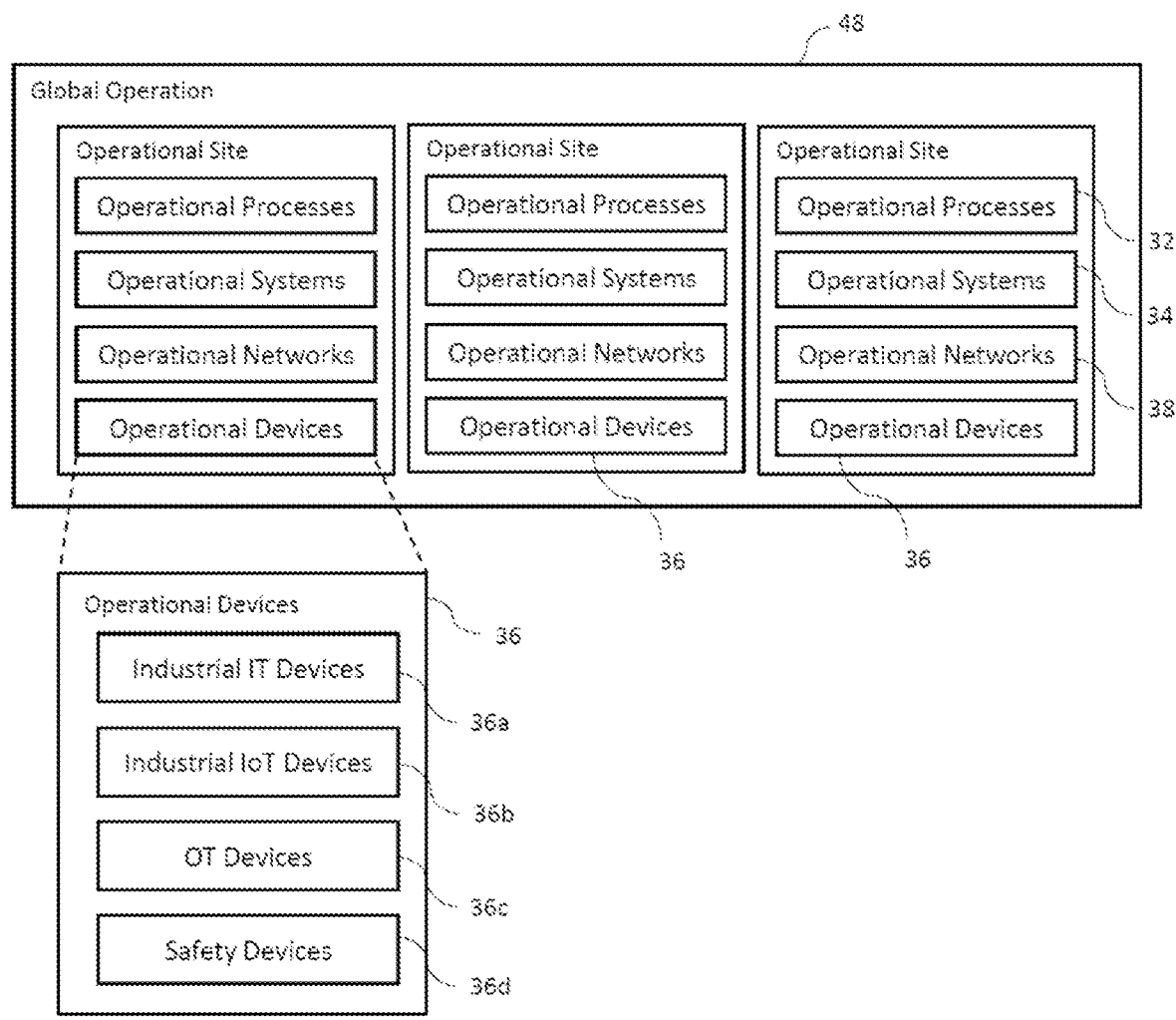
FIG. 5 is a schematic block diagram showing the details of the unique model template of the environment monitoring system of FIG. 2.

Various aspects of the EMSS 20 are discussed in greater detail below and illustrated in FIGS. 5 and 6. Considering firstly the Model Generation Process 40, as described briefly above, an aspect of the Model Generation Process 40 comprises categorising all operational elements (sites 30, processes 32, systems 34, networks 38, and devices 36) within the target monitored environment 12 into a structured model using the unique model template 48. The model template 48 is illustrated schematically by the block diagram in FIG. 5. The model template 48 is a template with six defined categories (e.g. a six-level hierarchical model). At the highest level, the model template 48 comprises global operation for an entity. Global operation may comprise operational sites, which in turn comprise four categories: operational processes 32, operational systems 34, operational networks 38, and operational devices 36. As illustrated, operational devices 36 may be further categorised into industrial information technology (IT) devices 36*a*, industrial IoT devices 36*b*, OT devices 36*c*, and safety devices 36*d*. It should be appreciated that the model template 48 allows all devices 36, both hardwired and smart devices, to be included, and thus encompasses all types of devices in an environment 12. Every element within a target industrial environment 12 may be sorted into one of the categories listed, to create a structured model/representation of the environment 12. The structured model may be considered as a hierarchical model comprising a global operation level in the hierarchy for elements common to all operational sites in the environment and at least one sub-level corresponding to each operational site. Each respective operational site then comprises at least one sub-level corresponding to operational processes performed on the respective operational site, the operational processes level comprises at least one sub-level corresponding to operational systems related to the respective operational processes, the operational systems level comprises at least one sub-level corresponding to operational networks in the respective operational systems and the operational networks level comprises at least one sub-level corresponding to operational devices in the respective operational networks. Additionally, the model template 48 may be applied to any environment 12, including small single site operations, and global operations that include multiple operational sites operating multiple complex processes.

The categories in the model template 48 correspond to the views in the generated environment simulation: the user may view a high-level representation comprising operational sites, and also 'zoom-in' on the environment simulation, and view individual processes 32, systems 34, networks 38, and devices 36. Users may navigate between different views as required. For example, in the environment simulation display, users may select safety devices 36*d* and thus view only the safety devices 36*d* operating within the environment 12. When defining the critical elements 52 to be monitored by the Intelligence Platform 42, as discussed above, specific categories from the model template 48 may be included in the definition. For example, the set of critical elements 52 may be defined by the users as safety devices, and thus only the real-time data of safety devices is monitored.

This structured representation is then used alongside the data from the information library 50 to create a structured model of the monitored environment 12 that also comprises information on how different elements of the environment 12 are connected. As described, the structured model is output to the Intelligence Platform 42, where the structured model is used alongside the information library 50 to create the environment simulation.

Figure 6:
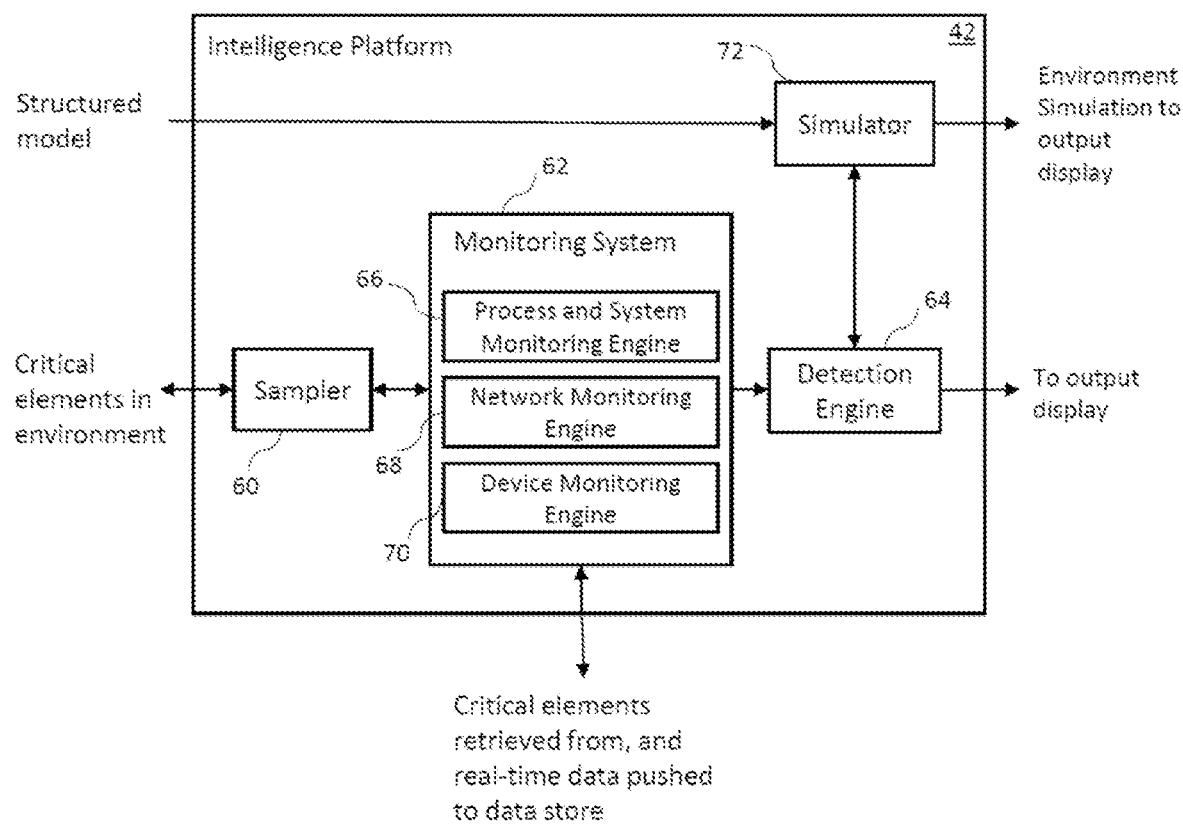
FIG. 6 is a schematic block diagram showing the details of the intelligence platform of the environment monitoring system of FIG. 4.

The Intelligence Platform 42 of FIG. 4 is shown in greater detail in the block diagram in FIG. 6. As illustrated, the Intelligence Platform 42 may comprise a sampler 60 in communication with a Monitoring System 62, which is, in turn, operatively coupled to a Detection Engine 64. The Monitoring System 62 may comprise a process and system monitoring engine 66, a network monitoring engine 68, and a device monitoring engine 70, each of which is configured to monitor various aspects of the environment 12. The Intelligence Platform 42 further comprises a Simulator 72, which is also in communication with the Detection Engine 64.

The simulator 72 is the component that receives the structured model from the Model Generation Process 40. The simulator 72 retrieves data from the information library 50 and converts the structured model and data from the information library 50 into the environment simulation. The environment simulation is a detailed, interactive visualisation of the environment 12, that allows users to easily navigate between various locations, 'zoom-out' to view the entire global operation as a whole or 'zoom-in' onto individual devices. In some embodiments, the simulation is created in the metaverse. The environment simulation also shows how different environment elements 30, 32, 34, 36, 38 are connected and relate to each other. Additionally, since the data in the information library 50 is incorporated into the environment simulation, the environment simulation also includes detailed information on individual devices 36 or networks 38, previously stored as metadata. For example, when the user selects a device 36 in the environment simulation, device thresholds, photos depicting normal operation, expected output values, or similar may be shown. This supporting information is very helpful to a user when assessing the cause or nature of an alert as it provides more related content about the event that occurred in the environment to cause the alert. In some embodiments, the simulation may be combined with virtual reality systems, and users may locate the element in the virtual world, and gain more information on the environment 12 in this way.

The environment simulation defines a validated state, or baseline, for the target environment 12, which is the operation of the environment 12 under normal operating conditions. The data used to create the environment simulation is validated at regular intervals (as discussed previously) and any changes in the environment 12 are provided to the simulator 72, which updates the environment simulation in line with the environment changes. The environment simulation is provided to the output display 44 to be displayed to the user.

During operation as a real-time alert system, the Monitoring System 62 receives a list of the set of critical elements 52 from the datastore 46, which are in turn provided to the sampler 60. The sampler 60 sends polling signals into the environment 12 at a polling rate that is adjustable and chosen by the user prior to use. In response to sending the polling signals, the sampler 60 receives signals from environment elements 30, 32, 34, 26, 38 defined as critical by the set of critical elements 52. It should be appreciated that in some embodiments the sampler may use different data collection methods for receiving signals from the critical elements 52.

The received signals comprise real-time data on each of the set of critical elements 52 of the environment 12, and these signals are both stored as historical data 51 in the datastore 46, and provided to the Monitoring System 62, where the individual monitoring engines 66, 68, 70 monitor the real-time data for the critical elements 52 in the environment 12. The specific monitoring engine 66 used is dependent on the element, for example the device monitoring engine 70 monitors critical devices etc.

The Monitoring System 62 continuously monitors the real-time data, comparing the received data for each critical element to corresponding data values of critical elements 52 when in the validated state of the environment 12, as defined in the environment simulation. Upon detecting a difference in the real-time data values as compared to the data values of the critical elements when in a validated state, the difference is provided to the Detection Engine 64. The Detection Engine 64 determines the environment elements related to (associated with) the element for which a difference is detected, by retrieving the linked elements from the simulator 72. The Detection Engine 64 then retrieves the historical real-time data 51 for the linked (associated) elements from the datastore 46, and all information (the real-time data on the element showing a deviation, and the historical real-time data 51 on all linked elements) is aggregated and incorporated into the simulation. An alert is then sent to the output display 44 to be viewed by the user and may be shown in the simulation at the precise location in the environment 12 where the element for which the alert was activated is located. This is advantageous as typically users may not be familiar with the layout of an operational site 30. The user can access the simulation, navigate to the specific element for which the alert was activated and select the specific element to view detailed information. Alongside information on the element the alert originated from, the user also has access to information on devices that may be affected by the variation, and data on related elements within the environment 12. In this way, much more information on the environment 12 is provided to users, who therefore have more information to help determine the correct action to take to solve the detected problem. This enhanced information may also be provided to first responders in the case of an emergency to better enable them to resolve the event that caused the alert. In some embodiments, not discussed in detail here, machine learning and artificial intelligence methods may implemented on the data so that the EMSS 20 is able to determine the cause of the alert, and suggest potential response options automatically. The alert is also provided in real-time, which is critical for the safety and security of operational environments 12, and aids in supporting the user to make objective and knowledgeable decisions on managing risk in the environment.

Training Simulator

As mentioned briefly previously, in some embodiments the EMSS 20 may operate as a training simulator. Returning to FIG. 4, when in use as a training simulator, the datastore 46 also comprises abnormal simulations 53 and algorithms 54. The abnormal simulations 53 are simulations of the target environment 12 that simulate abnormal operating conditions and are defined prior to use as a training simulator for the monitored environment 12. As such, the training simulator has two phases of operation: a configuration phase and a training phase. The abnormal simulations are created and stored during the configuration phase and are then used by trainees during the training phase. During the configuration phase, the abnormal simulations 53, are created by the EMSS 20. One option may be to provide parameters that create non-optimum (e.g. sub-optimal or abnormal) operating conditions to the information library 50 (setpoint values that cause failure, for example) and turn off the external validation tools. The Intelligence Platform 42 then creates an environment simulation using the same method as described previously, using the non-optimum parameters, which results in a simulation 53 that is not representative of the environment 12. Alternatively, the accurate, validated environment simulation created by the Intelligence Platform 42 may be manually edited in order to show (e.g. to be indicative of) a particular problem or abnormal operation (e.g. sub-optimal or abnormal operating conditions). The validated simulation may be edited by receiving an input (this may be described elsewhere herein as the first user input) indicating a change to be applied to one or more parameters in the simulation, For example, once the simulation is created, a device 36 may be disconnected within the simulation, which causes the temperature of an operational process to increase above safe values, causing a heat sensor to activate. Once created, the abnormal simulations 53 are stored in the datastore 46. Any number or abnormal simulations 53 may be generated and stored during the configuration phase.

Once the abnormal simulations 53 are created, the simulator can be used for training. In the training phase, a trainee undergoing training selects an abnormal simulation 53 via the output display 44, and the Intelligence Platform 42 retrieves the selected abnormal simulation 53 from the datastore 46 and provides the abnormal simulation 53 to the output display 44 to be viewed by the trainee. The trainee provides an input (this may be described elsewhere herein as the second user input) indicating feedback to the output display 44 where the feedback comprises an action that they may take to return the abnormal simulation 53 (showing sub-optimal or abnormal operating conditions) back to normal environment operating conditions. The feedback may include, for example, clicking on a device to turn off, specifying which operation team to inform, or selecting which processes should be shut down. The Intelligence Platform 42 receives the feedback from the output display 44 and retrieves the algorithms 54 from the datastore 46. The Intelligence Platform 42 uses the algorithms 54 alongside the received feedback to determine if the trainee has taken the correct action to resolve the problem shown in the abnormal simulation. The methods used to determine if the trainee took the correct action are discussed in detail later. Once the Intelligence Platform 42 determines if the correct action was taken by the trainee, a notification is output to the output display 44, informing the trainee if the correct action was taken or not.

In this way, the EMSS 20 operates as a training simulator, allowing trainees to gain knowledge on how the environment 12 operates. A simulator also provides a safe environment for operators to train their reactions to certain situations that may arise in a monitored environment 12, and to train on situations that are wasteful, costly, or dangerous to replicate in the real-world.

Method Flowcharts

Figure 7:
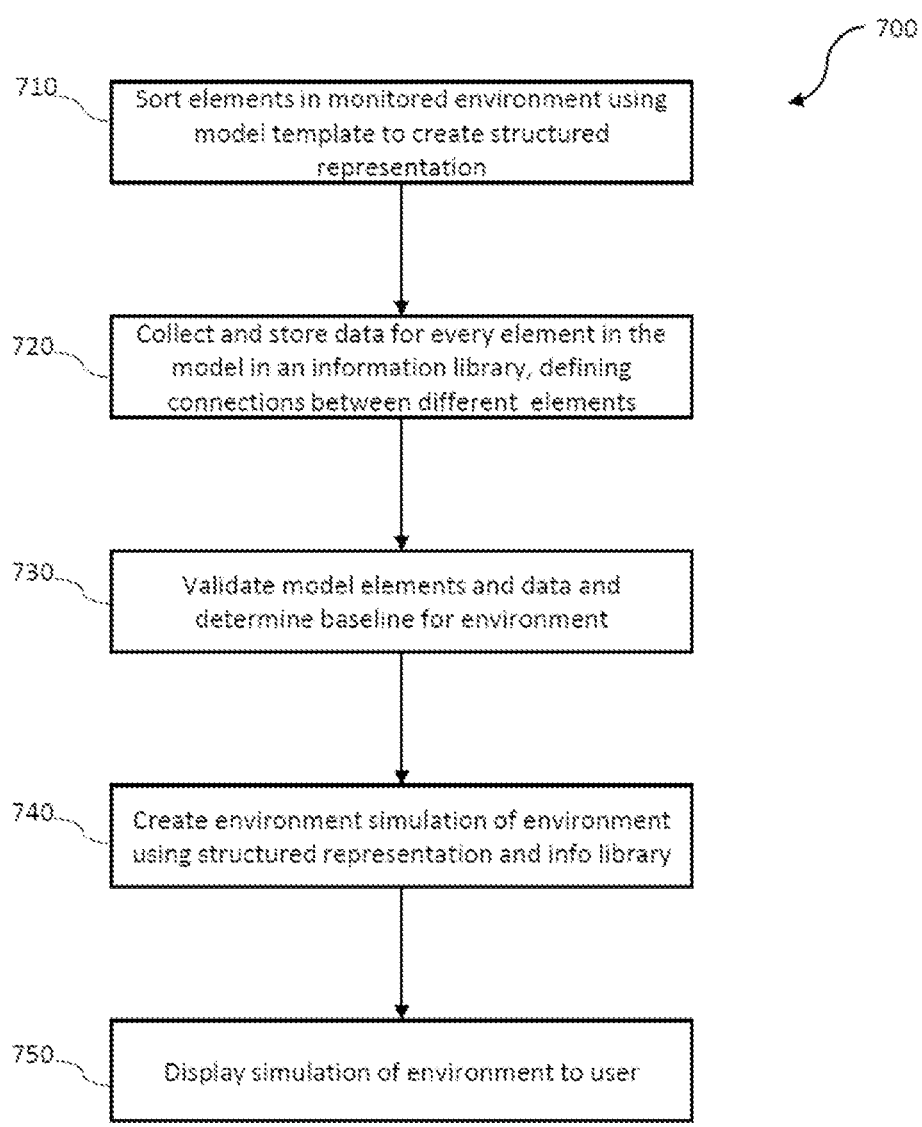
FIG. 7 is a flowchart of a method of creating an environment simulation using the environment monitoring system of FIG. 4.

As discussed in detail above, one aspect of the present disclosure relates to creating an environment simulation of the target monitored environment 12. The generated environment simulations may be used as part of a real-time alerting system or in a training simulator. A method 700 of creating an environment simulation according to aspects of the present disclosure is illustrated by the flowchart in FIG. 7. Firstly, all elements of the target industrial environment 12 are categorised (e.g. arranged or sorted), at Step 710, using the model template 48 to create a structured representation of the environment. An information library 50 is then created, at Step 720, and is stored. As discussed, the information library 50 contains data on all elements in the environment 12, including information on how different elements are operably connected or operably related to each other. While the flowchart in FIG. 7 shows creating the information library 50 occurring after creating the structured representation, in some embodiments the information library 50 may be created before or simultaneously to creating the structured representation. Both the structured representation and information library 50 are validated, at Step 730, to ensure all environment elements have been properly documented, and all data relating to the elements 14 is accurate. Accurate, validated data is important as this step acts to create the baseline for the Monitoring System 62, which compares all real-time data to the baseline values. Once validated, an environment simulation of the target environment 12 is created, at Step 740, using the structured model and the information library 50, and this environment simulation is then displayed, at Step 750, to the user. It should be appreciated that as the validation occurs at regular time intervals, the environment simulation is also regularly updated.

Figure 8:
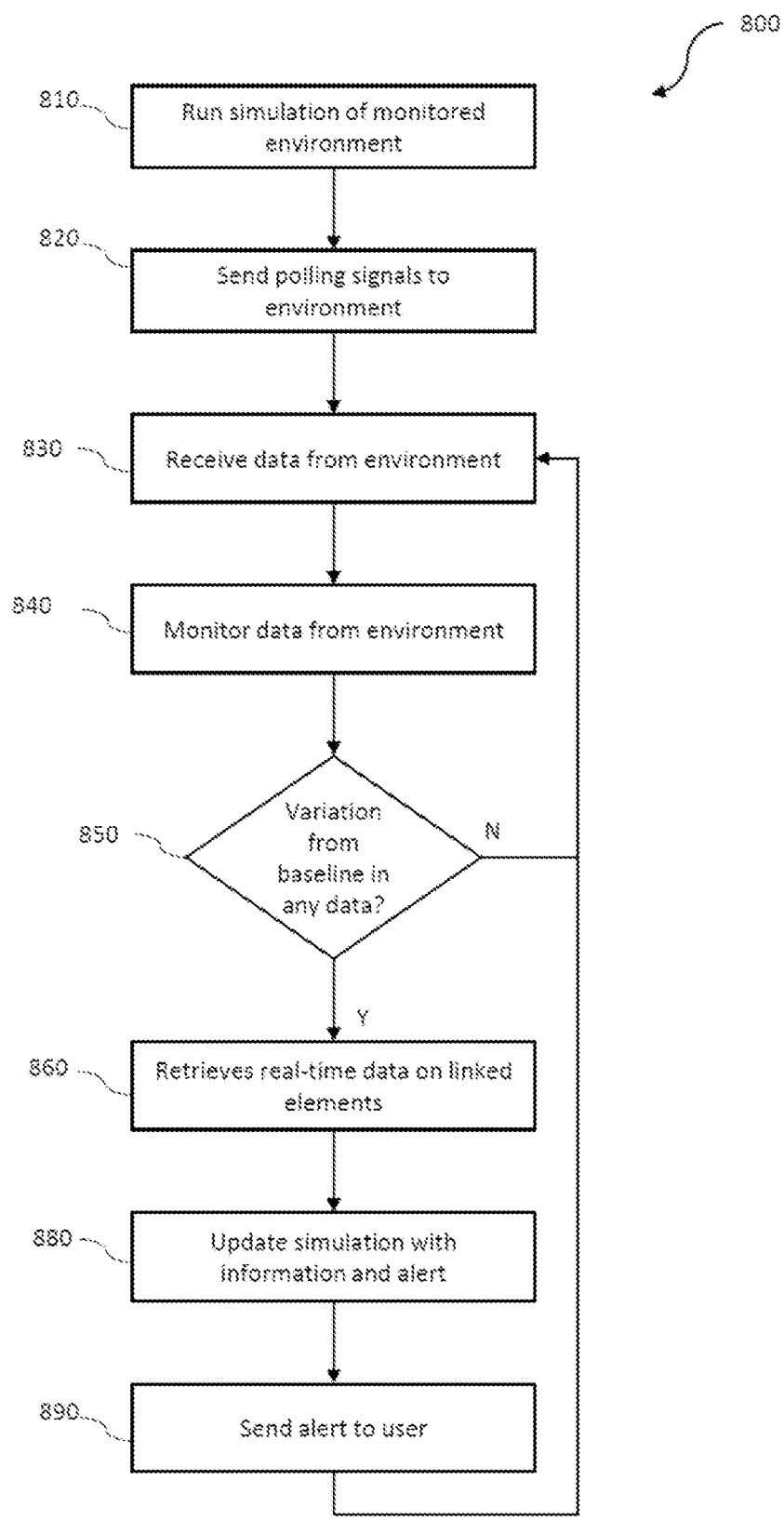
FIG. 8 is a flowchart of a method of using the environment monitoring system of FIG. 4 as a real-time Alert system.

The environment simulation is used when the EMSS 20 is functioning both as a real-time alert system, and as a training simulator. Considering firstly embodiments where the EMSS 20 functions as a real-time alert system, a method 800 of implementing the real-time alert system is illustrated by the flowchart in FIG. 8. The environment simulation of the monitored environment 12 runs, at Step 810, and sends, at Step 820, polling signals to the environment 12, polling the elements of the environment 12 that are to be monitored (defined by the set of critical elements 52). The system receives, at Step 830, real-time data from the set of critical elements 52 in the environment 12, and monitors, at Step 840, the received data. The system then determines, at Step 850, if there is a variation in the values of any of the received real-time data by comparing the values of the received real-time data to the values of the corresponding elements of the validated environment simulation, which contains detailed information on the healthy normal operation of the environment. If there is no difference between the values of the real-time data and the values of the corresponding elements of the validated environment simulation, the system repeats Steps 830, 840, and 850, continuing to receive and monitor data. If, at Step 850, there is a variation compared to the validated environment simulation (for example a received value of a parameter is higher than a threshold parameter value of the corresponding element in the validated environment simulation), the system 20 retrieves, at Step 860, all historical real-time data 51 for elements related to the element displaying a variation away from the validated environment simulation (relationships between elements are included in the environment simulation). The environment simulation is then updated, at Step 880, to incorporate all the retrieved data and an alert at the precise location of the element for which the variation was detected. The alert directs the user to the element within the simulation, where they can access detailed information relating to the real-time data of linked (associated) elements and information that is included in the information library 50. Providing detailed information with the alert (within this environment simulation) is advantageous as the user receives more information and thus has more knowledge of the environment 12, and so is able to make more informed decisions when determining the best action to take to address the alert. Once the environment simulation has been updated to include the information related to the alert and the alert, the system sends, at Step 890, the alert to the user. This may be via a notification on the output display 44, or, in some embodiments, a light flashing on the output display, a text message to the user's phone, or any other suitable method. In some embodiments, the EMSS 20 is configured to provide more serious alerts, such as sound alarms, if the deviation in data detected is more serious. The system then returns to Step 830, continuing to receive data from the environment 12, repeating Steps 830 to 890 in a loop.

The EMSS 20 according to embodiments of the present disclosure is able to provide a more robust monitoring system, which is able to monitor an entire monitored environment 12, rather than a limited number of systems or processes occurring within the monitored environment 12. It is advantageous to generate a complete environment simulation of the environment 12, as the complete documentation of every element allows any changes in the environment 12 to be detected. The EMSS 20 is able to detect environment 12 changes made by people (for example, logic changes on controllers), changes in processes (for example, conditions, alarms, or setpoints), or changes in technology (for example, new devices, network expansion, or site expansion). People, processes, and technology can all have a significant impact on the operation of an monitored environment 12. Being able to distinguish between human error, equipment failure, or a cyber-attack, for example, when monitoring a monitored environment 12 is a significant benefit of the EMSS 20 system.

An example of the EMSS 20 in use as a real-time alert system, relating to operational processes in an environment 12, is described in detail. In a particular operational process, a water level in a tank should be maintained below a particular threshold. The threshold is a setpoint value for a water level sensor in the tank. The setpoint value for the water level sensor is defined in the information library 50 and thus the threshold is included in the environment simulation generated by the Intelligence Platform 42. The environment simulation is generated, and the Monitoring System 62 receives real-time data from the water level sensor (which is defined as a critical element 52 by the user prior to monitoring). During monitoring, the sensor data may show a difference compared to the water level defined as the baseline in the validated environment simulation, and the Detection Engine 64 may determine that the water level has exceeded the setpoint value. In response to detecting this difference, the Intelligence Platform 42 retrieves all of the historical real-time data on elements linked to the water tank. The linked elements may include data from a sensor on the door to the room where the tank is located, data from CCTV cameras in the room, network data for the computer connected to the tank, and login details of the computer connected to the tank. An alert is then provided to be displayed in the environment simulation, and the data on the linked elements is included in the simulation, alongside the data from the water level sensor for which a difference was detected. The user can view this data and determine the most probable cause of the water level in the tank increasing. Thus, the user is more easily able to determine the best action to take to resolve the problem.

A further example of the EMSS 20 in use as a real-time alert system relates to the physical security of the environment 12, monitoring the impact of people on the monitored environment 12. The EMSS 20 may monitor who is accessing an operational site, and which doors they are using within the building, for example, via swipe card access. During operation, the Monitoring System 62 may detect a change in status of a Programmable Logic Controller (PLC) located in a Control Cabinet within a motor control room in the environment 12, where the new status is different to the status defined in the validated state of the environment 12. The Intelligence Platform 42 may then retrieve data on all linked elements for that PLC. For example, the Intelligence Platform 42 may retrieve data from swipe card devices showing who entered the control room and opened the control cabinet, data from the PLC relating to any laptops that have been connected, a list of operators who may have the password for the PLC, and any logic changes that occurred as a result in the change in status of the PLC. All of this data is incorporated into the environment simulation and an alert is provided to the user. The user therefore has enough data to determine that a certain operator, who has the PLC password entered the control room, opened the control cabinet, and connected their laptop. It is thus likely that the operator changed the status of the PLC. In previous monitoring systems, it is unlikely that a user would be able to determine what caused the change in PLC status, as the user would not have access to swipe card data, as this would typically be monitored by a dedicated security team. By viewing the simulation, the user of the EMSS 20 can also see the logic changes made to the PLC, for example the operator may have disabled a position alarm (intentionally or unintentionally), without reporting this change. The user can see that this alarm has been de-activated, determine if the de-activation is intentional, and act quickly to re-activate the alarm if required, thus avoiding any undesirable consequences in the environment 12. In previous monitoring systems, which are dedicated to monitoring only a single system or device, the monitoring system monitors only the PLC. It is therefore unlikely that disabling of the position alarm would be detected, since data on linked elements in the environment 12 is not available. This may have significant consequences in an industrial environment. For example, without an active position alarm a mechanical belt breakage in a production line may occur and cause a pause in production for several hours, which wastes a significant amount of time and money. Using the EMSS 20 of the present disclosure, this downtime in production is avoided.

Figure 9:
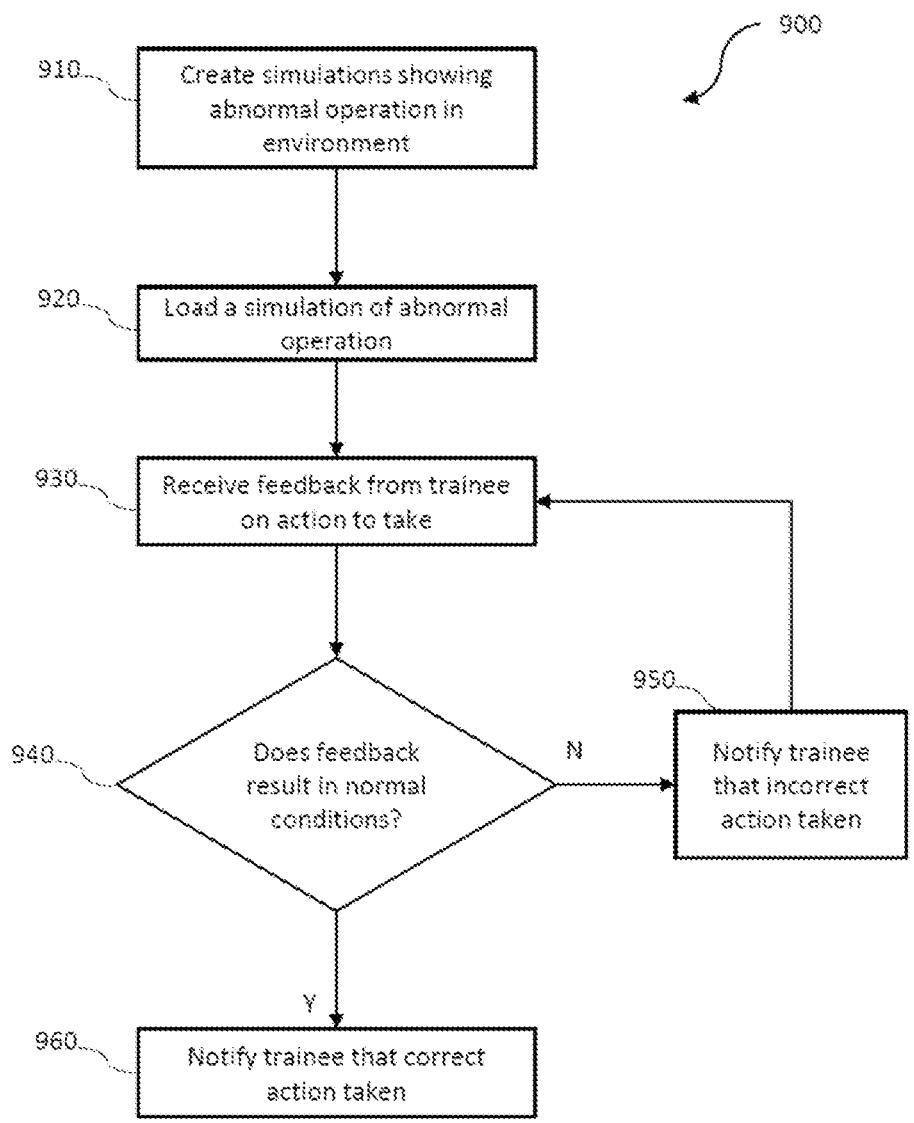
FIG. 9 is a flowchart of a method of using the environment monitoring system of FIG. 4 as a training simulator.

In some embodiments of the present disclosure, the EMSS 20 operates as a training simulator. An overview of the method 900 of implementing a training simulator is illustrated by the flowchart in FIG. 9. The EMSS 20 firstly creates, at Step 910, simulations 53 that show abnormal operation in a monitored environment 12. The system loads, at Step 920, one of the generated abnormal simulations 53 to be viewed by a trainee. The system then receives, at Step 930, feedback from the trainee on an action to take to correct the abnormality in the simulation 53. An action may comprise notifying the correct team (IT, operational, management), de-activating a device, activating safety protocols, or simply turning off the displayed alert if the trainee determines that the alert is not required, such as if the issue is minor and will resolve itself. For example, an alert may be generated if an incorrect code for a keycode lock on a door is entered. However, data on linked elements may show the person using the keycode lock, show that the person using the keycode lock has access to that room, and updated real-time data from the keycode lock may show the code was entered correctly immediately after the first attempt, indicating that the incorrect button was pressed by mistake on the first attempt. In this situation, the trainee may determine that the alert is not required and turn off the alert.

The EMSS 20 then determines, at Step 940, if the feedback from the trainee results in normal conditions in the simulation 53, which can be carried out using various methods (discussed in detail later). If the feedback does not result in normal operating conditions, then the system notifies, at Step 950, the trainee that an incorrect action was taken, and Steps 930 and 940 are repeated. If, at Step 940, the system determines that the trainee feedback resulted in normal conditions, the system notifies, at Step 960, the trainee that the correct action was taken.

As described briefly above, when operating as a training simulator, the EMSS 20 receives feedback from the trainee undergoing training, and then determines if a correct action was taken to return the simulation 53 to normal operating conditions. Example methods 1000 for determining if the correct feedback was received are illustrated by the flowchart in FIG. 10. As described in FIG. 9, the system loads, at Step 1010, a simulation 53 of abnormal operation in the environment 12 and then receives, at Steps 1050*a*, 1050*b*, 1050*c*, feedback from the trainee on which action to take.

Considering a first method for determining if the correct action was taken by the trainee, the system applies, at Step 1110, the received feedback to the abnormal simulation 53 and retrieves, at Step 1120, from the datastore 46, a simulation 53 showing normal operating conditions (which is generated using the method described previously). The system then compares, at Step 1130, the updated abnormal simulation 53 with the simulation 53 showing normal conditions, and determines, at Step 1140, if the updated simulation 53 matches the normal simulation 53. If the updated simulation 53 does not match the normal simulation 53 (is not within a threshold of matching), the trainee is notified at Step 1150 that an incorrect action has been taken, and Steps 1050*a* to 1140 are repeated. If, at Step 1140, the updated simulation 53 is found to match the normal simulation 53 (is within a threshold of matching), the analyst and trainee are notified, at Step 1160 that a correct action has been taken.

Figure 10:
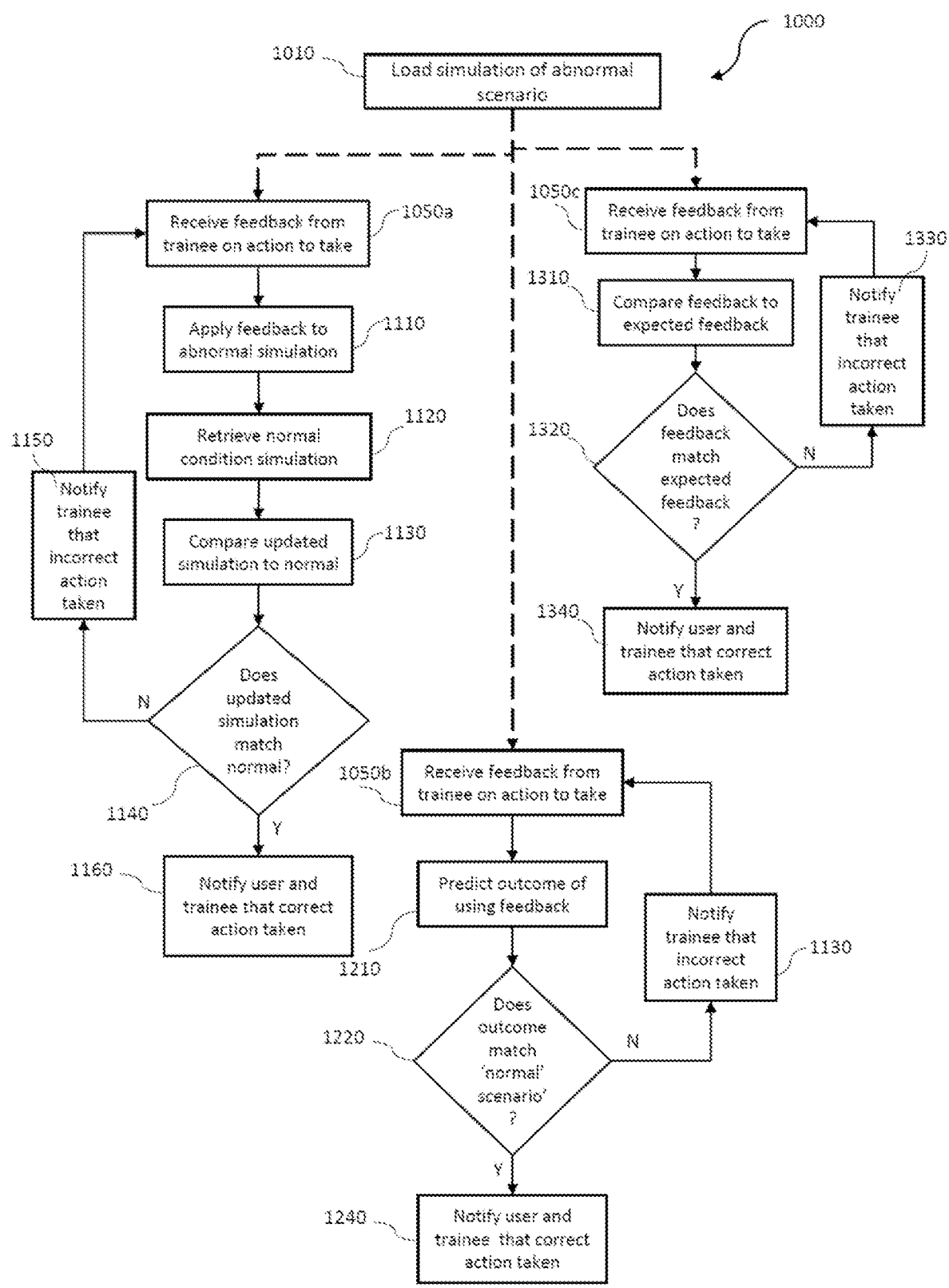
FIG. 10 is a flowchart of three different methods of using the environment monitoring system of FIG. 4 as a training simulator.

An alternative method for determining if the trainee takes the correct action is also illustrated in FIG. 10. After the system receives, at Step 1050*b*, feedback from the trainee, the system then predicts, at Step 1210, the outcome of this feedback on the environmental simulation. The system may predict the outcome using, for example, machine learning and/or artificial intelligence methods. The system then determines, at Step 1220, if the predicted outcome matches a normal operating scenario of the environment 12 (the simulation 53 of which is retrieved). If the predicted outcome does not match the normal operating scenario, the system provides, at Step 1130, a notification to the trainee that the incorrect action was taken, and Steps 1050*b* to 1130 are repeated. If the predicted outcome is found to match the normal scenario at Step 1220, the system provides, at Step 1240, a notification to the trainee and the analyst that the correct action was taken.

A further method for determining if the correct action is taken is also illustrated in Steps 1050*c* to 1340 in FIG. 10. Once the system receives, at Step 1050*c*, feedback from the trainee, the EMSS 20 compares, at Step 1310, the received feedback to the expected feedback. The comparison is possible since the EMSS 20 contains substantial amounts of data on the environment 12, and machine learning and/or artificial intelligence techniques can be used to determine an action that will return the abnormal operating conditions to normal operating conditions. The system determines, at Step 1320, if the received feedback matches the expected feedback, and if not, the system provides, at Step 1330, a notification to the trainee that the incorrect action was taken, and Steps 1050*c* to 1330 are repeated. If it is determined at Step 1320 that the feedback matches the expected feedback, the system provides, at Step 1340, a notification to the analyst and the trainee that the correct action was taken.

The EMSS 20 may use any of the above-described methods to determine if the trainee training on the simulator inputs the correct feedback for correcting an abnormal operating scenario. Training operators (trainees) using a training simulator as described above has many advantages over training in real-life situations. Firstly, the operator is trained on a simulation that exactly mirrors the industrial environment 12 for which they are training. As a result, the operator gains detailed knowledge of the environment 12, learning how each system, process, network, and device operate, and how each element affects different elements. Additionally, if the operator is to work for a global entity with multiple operational sites located across different countries, the operator can be trained in a specific location, using a single environment simulation, with no travel between operational sites required. The training simulator also provides a safer environment 12 for training of operators. For example, training for operation of a heavy industrial plant for making steel using the simulator enables the trainee operator to make mistakes in their analysis of the alert situation without actually endangering the lives of steel workers in the plant.

As described, the EMSS 20 of the present disclosure may be used as a real time alert system. Illustrative examples showing use cases of the EMSS 20 are discussed with reference to FIGS. 11 and 12.

Figure 11:
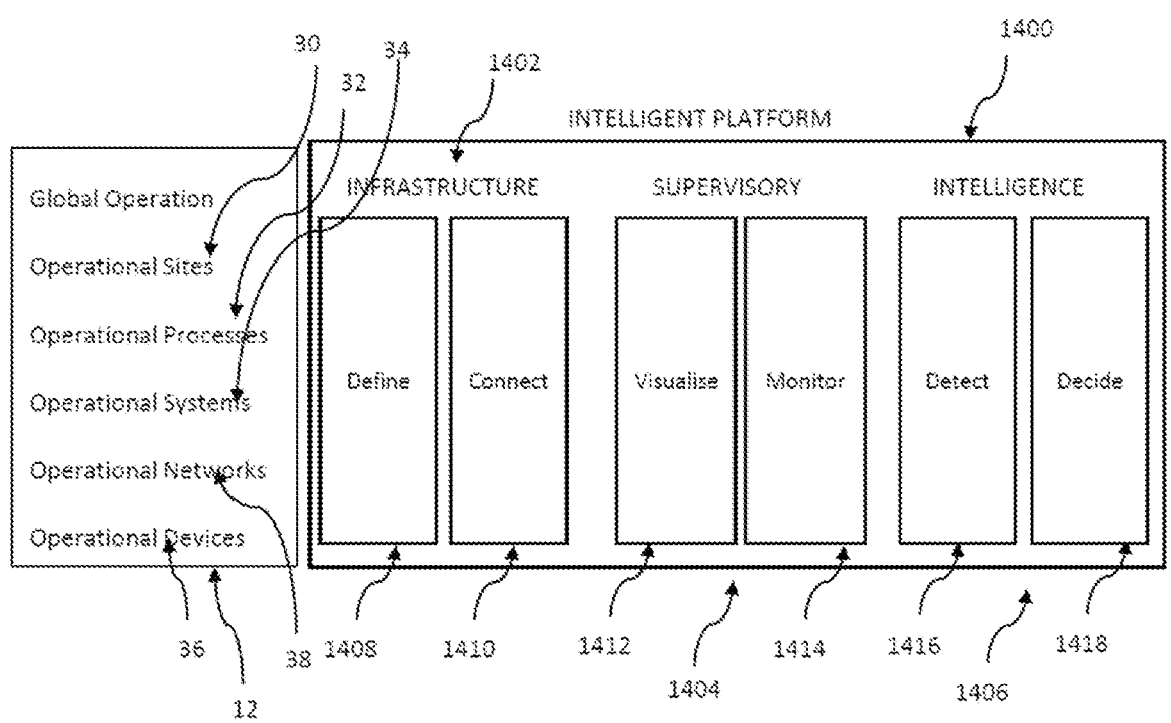
FIG. 11 is a schematic block diagram showing another embodiment of the present disclosure.

FIG. 11 is a schematic diagram showing an example of how the structured model generated using principles of the present disclosure may be used to create an alert system for an monitored environment 12. FIG. 11 shows the six model categories that may be used to create a structured model of a monitored environment 12: global operation, operational sites 30, operational processes 32, operational systems 34, operational networks 38, and operational devices 36. Alongside the modelling principle, FIG. 11 also shows an Intelligent Platform 1400 (which corresponds to the EMSS 20 discussed previously). In this instance, the Intelligent Platform 1400 has three components: infrastructure 1402, supervisory services 1404, and intelligence services 1406 which subdivide the overall functionality of the Intelligent Platform into different areas.

Firstly regarding infrastructure, the infrastructure comprises define components 1408 and connect components 1410. The define component 1408 relates to defining which of the elements in the target environment 12 to monitor, referred to as the critical elements 52 in the previous embodiment. The critical elements 52 are chosen by users and may relate to the elements most important for safe or productive operation. The connect component 1410 relates to establishing connectivity between the Intelligent Platform 1400 and the critical elements 52, which is required to allow monitoring of real-time data of the critical elements 52. Various aspects are considered when establishing connectivity between the critical elements 52 and the Intelligent Platform 1400. Examples include determining if the data will be collected directly from the critical element device or via a SCADA server, determining the rate of data collection, and deciding whether to include the ability to save data locally (which may be useful if the data collection method fails). Different data connection methods may be used for each critical element 52. In some embodiments, the connect stage 1410 may also include incorporating data diode hardware devices, which ensure that data only flows one way: from the critical elements 52 to the Intelligent Platform 1400 . . . . The critical elements 52 and the corresponding connectivity methods together make up the infrastructure for the Intelligent Platform 1400.

Considering next the supervisory services of the Intelligent Platform 1400, which includes both visualisation functionality 1412 and monitoring functionality 1414 of the environment 12. Visualisation functionality 1412 relates to creating an environment simulation of the environment 12 using the defined infrastructure, and creating a digital twin of the environment 12. The environment simulation thus allows users to have a comprehensive, interactive view of the environment 12. The monitoring function 1414 of the environment then comprises receiving real-time data from critical elements 52 within the environment 12. The real-time data may relate to relate to people, processes, or technology.

Finally, the intelligence services of the Intelligent Platform 1400 comprise both detect components 1416 and decide components 1418. The detect component 1416 is configured to detect problems with operations within the industrial environment 12. The problems may be the result of process deviations, network anomalies, or device health and status issues for example. It is important to detect any deviations or changes in the monitored environment 12 quickly, as such deviations can cause downtime, performance issues, or quality issues, which can be caused by, for instance, human errors, equipment failure or degradation, or cyber-attacks. The decide component 1418 of the intelligence services relates is configured to determining an appropriate alert to send to the user, and in some embodiments determining an appropriate action to take (for example, an emergency shut down, as described later).

The Intelligent Platform 1400, comprising the infrastructure, supervisory, and intelligence services, therefore provides the structure for a real-time alerting system that is more user-friendly, accurate, and robust, and can provide higher resolution alerts for the environment 12.

The EMSS 20 according to embodiments of the present disclosure has applications in many industries, since the EMSS 20 is able to monitor and detect both operational and cybersecurity risks. Some industries for which the EMSS 20 is suited, alongside aspects of risk management that may be used with the EMSS 20, are illustrated by the schematic illustration in FIG. 12.

Figure 12:
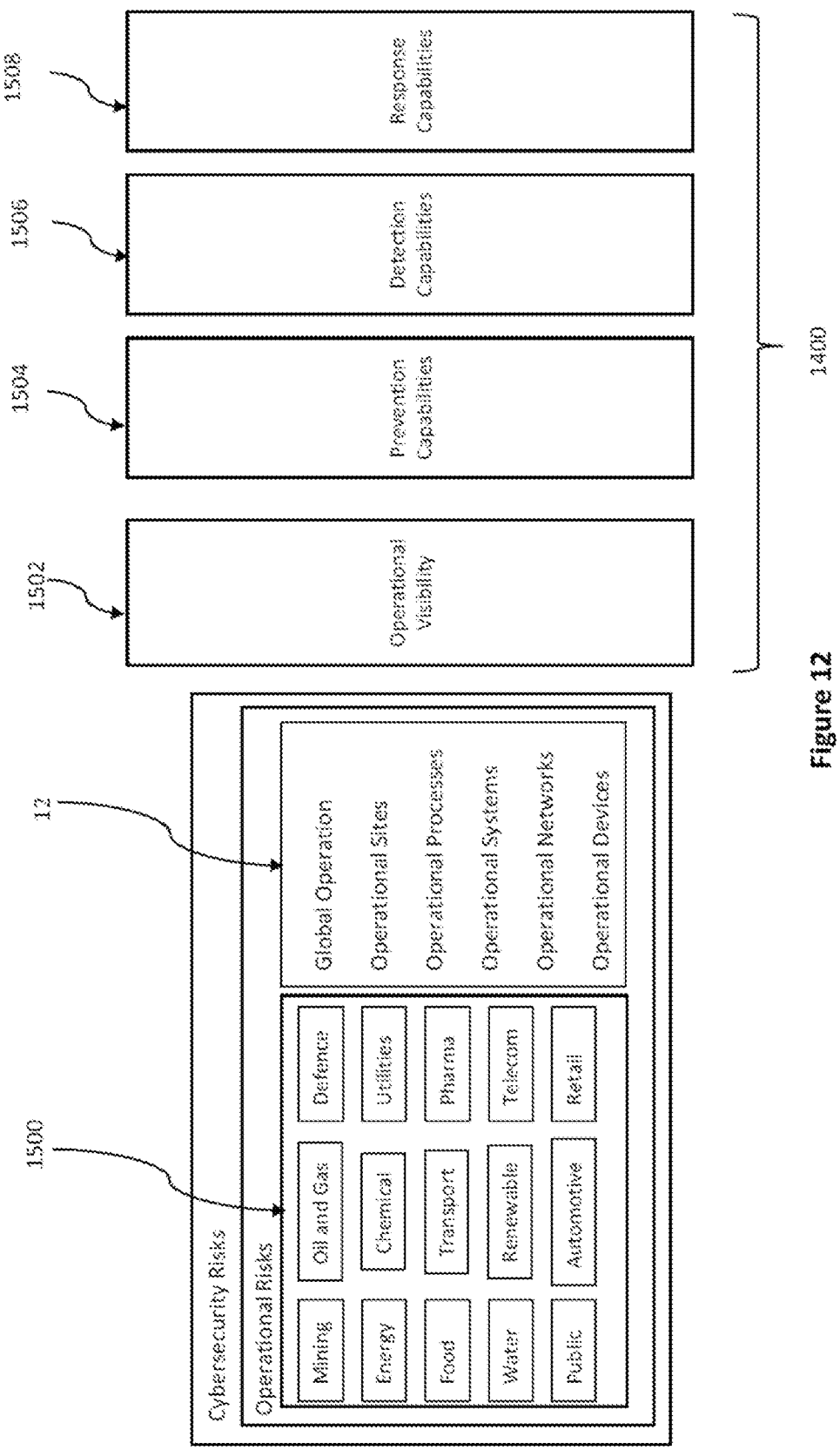
FIG. 12 is a schematic block diagram showing various industry sectors, which comprise both operational and cyber-security risks, and how the organisational structure shown in FIG. 5 is applied to provide various capabilities to the environmental monitoring system of FIG. 4.

Various industry sectors 1500 which comprise both operational and cyber-security risks, are shown in FIG. 12, for example mining, energy, transport, water, and pharma industries, among many others. The operational environment 12 of all these industries may be simulated using the techniques described above in relation to the operation of the EMSS 20.

As illustrated in FIG. 12, one aspect of the EMSS 20 is to provide operational visibility 1502, which is achieved through documenting every element in the environment 12, defining connections between elements, and generating an environment simulation of the environment 12. The environment simulation also includes detailed information on each element, relating to healthy operation of that element (for example expected output values, status etc). Full operational visibility of the environment 12 enables multiple risk management capabilities: prevention, detection, and response. The EMSS 20 of the present disclosure may, in some embodiments, provide prevention capabilities 1504. For example, if the health status of an operational network 38 changes, the EMSS 20 detects the change in status, and alerts the user. If the user is an operator, the user can shut down the network 38 before any devices 36 connected to the network 38 are adversely affected. If the user is simply an analyst (with no ability to change operations), the user can pass along instructions on which network to shut down to an operator, who can turn off the network before any connected devices 36 are affected.

Turning to detection capabilities 1506, as described above, the EMSS 20 monitors real-time data from critical elements 52 in the environment 12, and so is able to detect variations in the environment 12 in real-time, which is essential for managing risk. Finally, in some embodiments the EMSS 20 may provide response capabilities 1508, such as simply providing an alert on the screen when a minor deviation in data is detected, activating an alarm when a more serious deviation is detected, or sending an automated alarm to emergency services in the case of an emergency.

In some embodiments the EMSS 20 may provide an emergency shut down of operations when detecting a problem in the monitored environment 12. If, when monitoring real-time data from the critical elements 52 in the environment 12, the Intelligence Platform 42 detects a variation in data away from the data values of corresponding elements in the validated state of the environment 12 that has a significant impact for safety, the Intelligence Platform 42 may send a signal comprising instructions to shut down the critical element 52. The shut down instructions may specify shut down of an individual device or network, or a full operational site. An emergency shut down may be useful in industries such as nuclear or chemical power, where problems at plants can cause disastrous, dangerous consequences.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

Turning now to other embodiments, it will be appreciated that the method 20 may be embodied in a computer program. For example, a computer program product may comprise a computer readable medium, the computer readable medium having computer readable code embodied thereon. The computer readable code can be configured such that, on execution by a suitable computer or processor, the computer or processor is caused to perform the method or methods described herein (such as the methods 800 or 900).

A computer program may take different forms, for example, source code, compiled code, executable code, or any other type of code. It will be appreciated that the source code of computer programs may be written in a wide variety of different programming languages, and may take different architectural designs. For example, the functionality described herein may be split across various different sub-routines. Furthermore, the skilled person will appreciate that many different ways of splitting the functionality between the different sub-routines will be possible. The sub-routines may be stored together in one executable file to form a self-contained program. Furthermore, computer programs may call external and/or standard libraries of computer code for performing certain sub-tasks associated with the functionality described herein.

In another embodiment, there is a computer program product comprising non-transitory computer readable media, having stored thereon a computer program as described above. Examples of computer readable media include, but are not limited to: ROM, such as a CD ROM, a semi-conductor ROM or a magnetic recording medium such as a hard disk.

In another embodiment, there is a carrier containing a computer program. Examples of carriers include but are not limited to an electronic signal, optical signal, radio signal, computer storage medium, or similar. The carrier of a computer program may be any entity or device (e.g. hardware) capable of carrying the program. As an example, a carrier may be a computer readable media as described above. In other examples a carrier may be a transmissible carrier such as an electronic or optical signal, which may be conveyed via electrical or optical cable or by radio or other means.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these claims cannot be used to advantage. Any reference signs in the claims should not be construed as limiting the scope.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

CLAUSES

Clause 1: A computer implemented method for use in an environmental monitoring alert system to monitor an environment, the method comprising: arranging a plurality of elements in the environment into a structured model; creating an information library comprising data on the plurality of elements, the data comprising: connections between different elements of said plurality of elements; and operating data for each element; creating a first simulation of the environment from the structured model and the information library; receiving real-time data from the plurality of elements in the environment; comparing the real-time data for the plurality of elements to baseline data obtained from the first simulation; and initiating an alert in response to a deviation of the real-time data for a first element of the plurality of elements, from the baseline data for said first element.

Clause 2: The method as in Clause 1 wherein the environment comprises two or more operational sites; and wherein: the structured model is a hierarchical model, the hierarchical model comprising: a global operation level in the hierarchy for elements common to all operational sites in the environment and at least one sub-level corresponding to each operational site.

Clause 3: The method as in Clause 2 wherein: each respective operational site level comprises at least one sub-level corresponding to operational processes performed on the respective operational site; the operational processes level further comprising at least one sub-level corresponding to operational systems related to the respective operational processes; the operational systems level further comprising at least one sub-level corresponding to operational networks in the respective operational systems; and the operational networks level further comprising at least one sub-level corresponding to operational devices in the respective operational networks.

Clause 4: The method of any one of the preceding clauses further comprising: determining a second element that is connected to the first element, from the information library; and causing historical data for the second element to be displayed in the first simulation.

Clause 5: The method as in Clause 4 further comprising: receiving real-time data for all critical elements in the environment; comparing the real-time data for the critical elements to baseline data for said critical elements obtained from the first simulation; and initiating an alert in response to a deviation of the real-time data for any of the critical elements from the baseline data for said critical elements.

Clause 6: The method of any one of the preceding clauses wherein the connections indicate: physical proximity, logic connection, or data-transfer between said different elements.

Clause 7: The method of any one of the preceding clauses wherein the information library further comprises: data indicating a physical layout of an operational site in the environment; a digital twin of an element; and/or a three-dimensional model of an element.

Clause 8: The method of any one of the preceding clauses wherein the method further comprises: validating the plurality of elements in the model; and if a discrepancy between the environment and the structured model is detected, the method further comprises: updating the structured model and the first simulation to correct the baseline.

Clause 9: The method of any one of the preceding clauses wherein the step of creating the first simulation of the environment from the structured model and the information library comprises: creating an interactive three-dimensional visualisation of the environment.

Clause 10: The method of any one of the preceding clauses wherein the first simulation is created in a metaverse.

Clause 11: The method of any one of the preceding clauses further comprising: sending an instruction to a display to cause the first simulation of the environment to be displayed on the display.

Clause 12: The method of any one of the preceding clauses wherein the plurality of elements comprise: one or more devices; one or more processes; one or more operational sites; one or networks; and/or one or more systems; in the monitored environment.

Clause 13: The method as of any one of the preceding clauses wherein the environment is a production plant, a bank, an office, or a factory.

Clause 14: A computer implemented method for use in a training system for training a user to monitor an environment, the method comprising: arranging a plurality of elements in the environment into a structured model; creating an information library comprising data on the plurality of elements, the data comprising: connections between different elements of said plurality of elements; and operating data for each element; creating a first simulation of the environment, from the structured model and the information library; creating a second simulation of the environment, the second simulation having sub-optimal or abnormal operating conditions; and causing the second simulation to be presented on a display for use in a training simulation.

Clause 15: The method of Clause 14 wherein the step of creating a second simulation of the environment, the second simulation having sub-optimal or abnormal operating conditions, comprises: updating the information library by providing parameters that create sub-optimal or abnormal operating conditions in the environment; and creating the second simulation of the environment, from the structured model and the updated information library.

Clause 16: The method of Clause 14 wherein the step of creating a second simulation of the environment, the second simulation having sub-optimal or abnormal operating conditions, comprises: receiving a first user input from within the first simulation itself, the first user input indicating a change to be applied to one or more parameters in the simulation to create the second simulation of abnormal or sub-optimal operating conditions in the environment.

Clause 17: The method of Clause 14 or 15 further comprising: receiving a second user input indicating feedback comprising an action to take in response to the abnormal or sub-optimal operating conditions; determining whether performing the action in the second simulation results in a return to normal conditions in the second simulation; and causing a notification to be provided indicating whether the correct action was taken.

Clause 18: The method of Clause 17 wherein the step of determining whether performing the action in the second simulation results in a return to normal conditions in the second simulation comprises: updating the second simulation by performing the action in the second simulation; and comparing the updated second simulation to the first simulation, the first simulation acting as a baseline against which to assess the updated second simulation.

Clause 19: The method of Clause 17 wherein the step of determining whether performing the action in the simulation results in a return to normal conditions in the simulation comprises: predicting the outcome of performing the action in the second simulation; and comparing the predicted outcome to the first simulation, the first simulation acting as a baseline.

Clause 20: The method of Clause 17 wherein the step of determining whether performing the action in the simulation results in a return to normal conditions in the simulation comprises: using the second simulation to predict an appropriate action to perform in the second simulation; and comparing the predicted action to the action indicated in the second user input.

Clause 21: The method as in any one of clauses 14 to 20 wherein the environment comprises two or more operational sites; and wherein: the structured model is a hierarchical model, the hierarchical model comprising: a global operation level in the hierarchy for elements common to all operational sites in the environment and at least one sub-level corresponding to each operational site.

Clause 22: The method as in Clause 21 wherein: each respective operational site level comprises at least one sub-level corresponding to operational processes performed on the respective operational site; the operational processes level further comprising at least one sub-level corresponding to operational systems related to the respective operational processes; the operational systems level further comprising at least one sub-level corresponding to operational networks in the respective operational systems; and the operational networks level further comprising at least one sub-level corresponding to operational devices in the respective operational networks.

Clause 23: A computer implemented method for use in monitoring an environment, the method comprising: arranging a plurality of elements in the environment into a structured model; creating an information library comprising data on the plurality of elements, the data comprising: connections between different elements of said plurality of elements; and operating data for each element; and creating a first simulation of the environment, from the structured model and the information library.

Clause 24: The method as in Clause 23 wherein the environment comprises two or more operational sites; and wherein: the structured model is a hierarchical model, the hierarchical model comprising: a global operation level in the hierarchy for elements common to all operational sites in the environment and at least one sub-level corresponding to each operational site.

Clause 25: The method as in Clause 24 wherein: each respective operational site level comprises at least one sub-level corresponding to operational processes performed on the respective operational site; the operational processes level further comprising at least one sub-level corresponding to operational systems related to the respective operational processes; the operational systems level further comprising at least one sub-level corresponding to operational networks in the respective operational systems; and the operational networks level further comprising at least one sub-level corresponding to operational devices in the respective operational networks.

Clause 26: A computer system for use in an environmental monitoring alert system to monitor an environment, the computer system comprising: a memory comprising instruction data representing a set of instructions; and a processor configured to communicate with the memory and to execute the set of instructions, wherein the set of instructions when executed by the processor, cause the processor to: arrange a plurality of elements in the environment into a structured model; create an information library comprising data on the plurality of elements, the data comprising: connections between different elements of said plurality of elements; and operating data for each element; create a first simulation of the environment, from the structured model and the information library; receive real-time data from the plurality of elements in the environment; compare the real-time data for the plurality of elements to baseline data obtained from the first simulation; and initiate an alert in response to a deviation of the real-time data for a first element of the plurality of elements, from the baseline data for said first element.

Clause 27: A computer system for use in a training system for training a user to monitor an environment, the computer system comprising: a memory comprising instruction data representing a set of instructions; and a processor configured to communicate with the memory and to execute the set of instructions, wherein the set of instructions when executed by the processor, cause the processor to: arrange a plurality of elements in the environment into a structured model; create an information library comprising data on the plurality of elements, the data comprising: connections between different elements of said plurality of elements; and operating data for each element; and create a first simulation of the environment, from the structured model and the information library; create a second simulation of the environment, the second simulation having sub-optimal or abnormal operating conditions; cause the second simulation to be presented on a display for use in a training simulation.

Clause 28: A computer system for use in monitoring an environment, the computer system comprising: a memory comprising instruction data representing a set of instructions; and a processor configured to communicate with the memory and to execute the set of instructions, wherein the set of instructions when executed by the processor, cause the processor to: arrange a plurality of elements in the environment into a structured model; create an information library comprising data on the plurality of elements, the data comprising: connections between different elements of said plurality of elements; and operating data for each element; and create a first simulation of the environment, from the structured model and the information library.

Clause 29: A computer program comprising instructions which, when the program is executed by a computer, cause the computer to carry out the method of any one of clause 1 to 25.

Clause 30: A computer program product comprising non-transitory computer readable media having stored thereon a computer program according to Clause 29.

What is claimed is:

1. A computer implemented method for use in an environmental monitoring alert system to monitor an operational environment and generate an enriched information alert in response to detection of an abnormal operating condition within the operational environment, the method comprising:
  at a computer system having one or more processors and memory storing one or more programs, wherein the one or more programs are configured to be executed by the one or more processors:
  receiving a structured model of a target environment, wherein:
    the target environment comprises two or more operational sites;
    the structured model is automatically generated based on a model template and a plurality of data elements of the target environment;
    the structured model is a hierarchical model, the hierarchical model comprising:
    a global operation level in the hierarchy for elements common to all operational sites in the environment and at least one sub-level corresponding to an operational site level of the corresponding operational site;
    the model template and the plurality of data elements are stored in a datastore; and
    the plurality of data elements include at least one of operational sites, operational processes, operational systems, operational networks, and operational devices;
  receiving, from an information library stored in the datastore, data on the plurality of elements, the data comprising:
    connection data describing connections between different elements of said plurality of elements; and
    operating data for each element;

generating a first simulation of the target environment from the structured model and the data on the plurality of elements obtained from the information library stored in the datastore, wherein the first simulation of the target environment corresponds to a validated state of the target environment within normal operating ranges of respective parameters;

sending polling signals from the environmental monitoring system, via a communications channel, to the target environment to poll the elements of the target environment;

receiving real-time data from the plurality of elements in the target environment in response to the polling signals, indicating the real-time status of each of the plurality of elements;

comparing the real-time data for the plurality of elements to baseline data obtained from the first simulation;

detecting a deviation of the real-time data for a first element of the plurality of elements, from the baseline data obtained from the first simulation for said first element, the deviation representing the abnormal operating condition;

retrieving, by the environmental monitoring system, operation status data from elements connected to the first element as determined by the connection data and the structured hierarchical model, and metadata regarding elements connected to the first element, wherein the elements connected to the first element do not trigger the detected deviation;

generating the enriched information alert in response to detection of the deviation, the enriched information alert including operation status information from the elements connected to the first element and metadata regarding elements connected to the first element; and sending an instruction to a display to cause the first simulation of the target environment and the enriched information alert to be displayed on the display, the enriched information alert providing information to enable diagnosis and reversion of the operational environment back to a normal operating condition.

2. The method of claim 1, wherein:
each respective operational site level comprises at least one sub-level corresponding to operational processes performed on the respective operational site;
the operational processes level further comprising at least one sub-level corresponding to operational systems related to the respective operational processes;
the operational systems level further comprising at least one sub-level corresponding to operational networks in the respective operational systems; and
the operational networks level further comprising at least one sub-level corresponding to operational devices in the respective operational networks.

3. The method of claim 1, further comprising:
determining a second element that is connected to the first element, from the information library stored in the datastore; and
causing historical data for the second element to be displayed in the first simulation.

4. The method of claim 3, further comprising:
receiving real-time data for all critical elements in the target environment;
comparing the real-time data for the critical elements to baseline data for said critical elements obtained from the first simulation; and
initiating an alert in response to a deviation of the real-time data for any of the critical elements from the baseline data for said critical elements.

5. The method of claim 1, wherein the connections indicate: physical proximity, logic connection, or data-transfer between said different elements.

6. The method of claim 1, wherein the information library further comprises:
data indicating a physical layout of an operational site in the target environment;
a digital twin of an element; and/or
a three-dimensional model of an element.

7. The method of claim 1, wherein the method further comprises:
validating the plurality of elements in the model; and
when a discrepancy between the environment and the structured model is detected, the method further comprises:
updating the structured model and the first simulation to correct the baseline.

8. The method of claim 1, wherein generating the first simulation of the target environment from the structured model and the information library comprises:
creating an interactive three-dimensional visualisation of the target environment.

9. The method of claim 1, wherein the first simulation is created in a metaverse.

10. The method of claim 1, wherein the plurality of elements comprise:
one or more devices;
one or more processes;
one or more operational sites;
one or networks; and/or
one or more systems;
in the target environment.

11. The method of claim 1, wherein the target environment is a production plant, a bank, an office, or a factory.

12. A computer implemented method for use in a training system for training a user to monitor an operational environment and generate an enriched information alert in response to generation of an abnormal operating condition within the operational environment, the method comprising:
at a computer system having one or more processors and memory storing one or more programs, wherein the one or more programs are configured to be executed by the one or more processors:
receiving a structured model of a target environment, wherein:
the target environment comprises two or more operational sites;
the structured model is automatically generated based on a model template and a plurality of data elements of the target environment;
the structured model is a hierarchical model, the hierarchical model comprising:
a global operation level in the hierarchy for elements common to all operational sites in the environment and at least one sub-level corresponding to an operational site level of the corresponding operational site;
the model template and the plurality of data elements are stored in a datastore; and
the plurality of elements include operational sites, operational processes, operational systems, operational networks, and operational devices;
receiving, from an information library stored in the datastore, data on the plurality of elements, the data comprising:

connection data describing connections between different elements of said plurality of elements; and
operating data for each element;
generating a first simulation of the target environment from the structured model and the data on the plurality of elements obtained from the information library stored in the datastore, wherein the first simulation of the target environment corresponds to a validated state of the target environment within normal operating ranges of respective parameters;
generating a second simulation of the target environment, the second simulation corresponds to a state of the target environment where a first element of the plurality of elements is operating under sub-optimal or abnormal operating conditions, wherein generating the second simulation of the target environment comprises retrieving operation status data from elements connected to the first element as determined by the connection data and the structured hierarchical model and metadata regarding elements connected to the first element, wherein the elements connected to the first element do not trigger the detected deviation and incorporating the operation status data into the second simulation;
generating the enriched information alert in response to generation of the second simulation, the enriched information alert including operation status information from the elements connected to the first element and metadata regarding elements connected to the first element; and
sending an instruction to a display to cause the second simulation and the enriched information alert to be displayed on the display, the enriched information alert providing information to enable diagnosis and reversion of the operational environment back to a normal operating condition for use in a training simulation.

13. The method of claim 12, wherein generating the second simulation of the target environment further comprises:
updating the information library by providing parameters that create sub-optimal or abnormal operating conditions in the target environment; and
generating the second simulation of the target environment from the structured model and the updated information library.

14. The method of claim 12, wherein generating the second simulation of the target environment further comprises:
receiving a first user input changing one or more operating conditions of the first simulation; and
in response to the first user input, changing one or more parameters in the first simulation to create the second simulation of abnormal or sub-optimal operating conditions in the target environment.

15. The method of claim 13, further comprising:
receiving a second user input indicating feedback comprising an action to take in response to the abnormal or sub-optimal operating conditions;
determining whether performing the action in the second simulation results in a return to normal conditions in the second simulation; and
causing a notification to be provided indicating whether the correct action was taken.

16. The method of claim 15, wherein determining whether performing the action in the second simulation results in a return to normal conditions in the second simulation comprises:

updating the second simulation by performing the action in the second simulation; and
comparing the updated second simulation to the first simulation, the first simulation acting as a baseline against which to assess the updated second simulation.

17. The method of claim 15, wherein determining whether performing the action in the second simulation results in a return to normal conditions in the second simulation comprises:
predicting the outcome of performing the action in the second simulation; and
comparing the predicted outcome to the first simulation, the first simulation acting as a baseline.

18. The method of claim 15, wherein determining whether performing the action in the second simulation results in a return to normal conditions in the second simulation comprises:
using the second simulation to predict an appropriate action to perform in the second simulation; and
comparing the predicted action to the action indicated in the second user input.

19. The method of claim 12, wherein:
each respective operational site level comprises at least one sub-level corresponding to operational processes performed on the respective operational site;
the operational processes level further comprising at least one sub-level corresponding to operational systems related to the respective operational processes;
the operational systems level further comprising at least one sub-level corresponding to operational networks in the respective operational systems; and
the operational networks level further comprising at least one sub-level corresponding to operational devices in the respective operational networks.

20. A computer system for use in an environmental monitoring alert system to monitor an operational environment and generate an enriched information alert in response to detection of an abnormal operating condition within the operational environment, the computer system comprising:
a memory comprising instruction data representing a set of instructions; and
a processor configured to communicate with the memory and to execute the set of instructions, wherein the set of instructions, when executed by the processor, cause the processor to:
receive a structured model of a target environment, wherein:
the target environment comprises two or more operational sites;
the structured model is automatically generated based on a model template and a plurality of data elements of the target environment;
the structured model is a hierarchical model, the hierarchical model comprising:
a global operation level in the hierarchy for elements common to all operational sites in the environment and at least one sub-level corresponding to an operational site level of the corresponding operational site;
the model template and the plurality of data elements are stored in a datastore; and
the plurality of data elements include operational sites, operational processes, operational systems, operational networks, and operational devices;
receive, from an information library stored in the datastore, data on the plurality of elements, the data comprising:

connection data describing connections between different elements of said plurality of elements; and operating data for each element;

generate a first simulation of the target environment from the structured model and the data on the plurality of elements obtained from the information library stored in the datastore, wherein the first simulation of the target environment corresponds to a validated state of the target environment within normal operating ranges of respective parameters;

send polling signals from the environmental monitoring system, via a communications channel, to the target environment to poll the elements of the target environment;

receive real-time data from the plurality of elements in the target environment in response to the polling signals, indicating the real-time status of each of the plurality of elements;

compare the real-time data for the plurality of elements to baseline data obtained from the first simulation;

detect a deviation of the real-time data for a first element of the plurality of elements, from the baseline data obtained from the first simulation for said first element, the deviation representing the abnormal operating condition;

retrieve operation status data from elements connected to the first element as determined by the connection data and the structured hierarchical model, and metadata regarding elements connected to the first element, wherein the elements connected to the first element do not trigger the detected deviation;

generate the enriched information alert in response to detection of the deviation, the enriched information alert including operation status information from the elements connected to the first element and metadata regarding elements connected to the first element; and send an instruction to a display to cause the first simulation of the target environment and the enriched information alert to be displayed on the display, the enriched information alert providing information to enable diagnosis and reversion of the operational environment back to a normal operating condition.

21. The method of claim 1, wherein the information library comprises metadata, the metadata comprising both unstructured and structured data regarding the target environment and the plurality of elements.

22. The method of claim 21, wherein the unstructured data comprises a blueprint of an operational site in the target environment, a room layout for an operational site in the target environment, an operation manual or standard operating procedure for an element, a maintenance list for an element, a flow diagram for an element, a PID (Proportional Integral Derivative) loop for an element, or a combination thereof.

23. The method of claim 21, where the unstructured data is stored as text, a spreadsheet, a photograph, a video, or a combination thereof.

24. The method of claim 21, wherein the structured data comprises data describing connections between the plurality of elements.

25. The method of claim 1, further comprising: automatically generating the structured model of the target environment from the model template and the plurality of data elements of the target environment.

26. The method of claim 25, wherein automatically generating the structured model of the target environment comprises categorizing the plurality of elements based on the model template.

\* \* \* \* \*